(12) United States Patent
Belbin et al.

(10) Patent No.: US 9,195,919 B2
(45) Date of Patent: Nov. 24, 2015

(54) FIXED MEMORY RENDERING

(71) Applicant: CANON KABUSHIKI KAISHA, Tokyo (JP)

(72) Inventors: Joseph Leigh Belbin, Mount Colah (AU); Gregory William Tan, Seattle, WA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/446,848

(22) Filed: Jul. 30, 2014

(65) Prior Publication Data
US 2015/0036162 A1 Feb. 5, 2015

(30) Foreign Application Priority Data
Jul. 30, 2013 (AU) .................................. 2013211450

(51) Int. Cl.
*G06K 15/00* (2006.01)
*G06K 15/02* (2006.01)
(52) U.S. Cl.
CPC .......... *G06K 15/1828* (2013.01); *G06K 15/181* (2013.01)
(58) Field of Classification Search
CPC ......... H04N 1/41; H04N 1/6025; H04N 1/64; G06K 15/1828; G06K 15/181
USPC ................................ 358/1.1–3.29, 1.11–1.18
See application file for complete search history.

(56) References Cited

U.S. PATENT DOCUMENTS

| | | |
|---|---|---|
| 5,479,587 A | 12/1995 | Campbell et al. |
| 5,524,186 A | 6/1996 | Campbell |
| 5,832,126 A | 11/1998 | Tanaka |
| 7,046,253 B2 | 5/2006 | Long et al. |
| 7,113,309 B2 | 9/2006 | Furuya |
| 7,561,303 B2 | 7/2009 | Groarke et al. |
| 7,724,974 B2 | 5/2010 | Koziarz |
| 7,978,196 B2 | 7/2011 | Combes et al. |
| 8,130,429 B2 | 3/2012 | Ferlitsch |
| 8,411,942 B2 | 4/2013 | Chen et al. |
| 2007/0206012 A1* | 9/2007 | Combes et al. ............... 345/441 |
| 2012/0257253 A1* | 10/2012 | Isshiki ........................ 358/1.16 |

FOREIGN PATENT DOCUMENTS

AU 2010201321 A1 10/2011

* cited by examiner

*Primary Examiner* — Marcellus Augustin
(74) *Attorney, Agent, or Firm* — Canon U.S.A., Inc. IP Division

(57) ABSTRACT

A method of forming print instructions in a host for rendering within a fixed amount of memory on a printer receives intermediate data comprising regions which are associated with drawing instructions. A first amount of memory available to render the intermediate data is calculated based on a second amount of memory needed by the printer to store the intermediate data. The host determines a subset of the drawing instructions as complex drawing instructions and renders the complex drawing instructions to the printer as simpler drawing instructions. For regions associated with the complex drawing instructions, the host reassociates the regions with the corresponding simpler drawing instructions to form altered intermediate data which can be rendered on the printer within the determined first amount of memory. The print instructions, including the altered intermediate print data, can then be rendered by the printer to pixel data within the fixed amount of memory.

17 Claims, 12 Drawing Sheets

FIXED MEMORY RENDERING

REFERENCE TO RELATED PATENT APPLICATION(S)

This application claims the benefit under 35 U.S.C. §119 of the filing date of Australian Patent Application No. 2013211450, filed 30 Jul. 2013, hereby incorporated by reference in its entirety as if fully set forth herein.

TECHNICAL FIELD

The present invention relates generally to image reproduction systems and, in particular, to a printing system configured for handling arbitrary input using a low-memory rendering device.

BACKGROUND

Some printing systems are split into "host" and "device" portions. The host part is often a print server or a personal computer (PC) device driver, with the device part (e.g. a printer) being a simpler hardware device including a print engine, that performs the actual printing to create the print output. An advantage of these systems is that the printer hardware can be simplified, with some processing off-loaded to the more capable host. The data transferred from the host can be a page description language (PDL) document, bands of rendered pixels, or data in an intermediate format. In such a split system, the printing device can have a lower capability processor with a fixed and comparatively small memory capacity. In general, the source document can be arbitrarily complex, and yet the device has limited and fixed memory available to render the potentially complex drawing instructions of the document. As a result, split printing systems must make various compromises to ensure that the document can be rendered with adequate output quality and in a useful timeframe.

One method of printing in a split system is to render the page to bands of pixels on the host. The bands are compressed before being sent to the print device. If there is not enough room to store the print data on the device, there are several options that can be taken. One option is to perform successively more aggressive compression methods until the data fits in the device. Usually this includes lossy compression methods that discard increasing amounts of data. It can be appreciated that this can degrade the quality of output. A second option is for the device to begin passing data to the print engine before the device has received all the data for a page. While this means that the device can process print data that is larger than the available memory on the device, a disadvantage is that the system must continue to supply data at the rate the data is consumed by the print engine, once output has commenced. If the host or the data transmission cannot maintain this data rate, some printing methods will introduce artefacts if the print head is stopped whilst waiting for more data to be received, while others cannot stop the printer hardware at all.

A second method of printing in a split system is to send the entire source document from the host to the device in PDL format. An advantage of this approach is that the PDL format is generally much smaller than the corresponding pixel rendered data. This makes it much more likely that the document will fit within the device memory. There are several disadvantages to this approach. Firstly, the device needs to be much more capable, in order to process the PDL data. In particular, the amount of working memory required to process an arbitrary PDL document can be quite high, often exceeding the available remaining space in the device, once the document has been received. The executable code in the device will also need to be larger, incurring a higher cost. Finally, as all the processing is being performed in a lower capability device, it is likely that processing times will be greater.

A third method of printing in a split system is for the host to convert the PDL data to intermediate format data, which is then sent to the device. Examples of intermediate formats include display list data and fillmap data. The device is responsible for rendering the intermediate format data to pixels, which are passed to the print engine. An advantage of this method is that the transferred data size is less than the size of the pixel data. Another advantage is that some processing can be offloaded to the host, allowing the device to be lower cost. This method still has the disadvantages that the required space for storage and processing could potentially be larger than is available in the device.

SUMMARY

According to one aspect of the present disclosure, there is provided a method of forming print instructions in a host device for rendering within a fixed amount of memory on an image reproduction device coupled to the host device via a communications network. The method receives on the host device intermediate print data comprising regions which are each associated with drawing instructions, the intermediate print data being converted from a page description. The method calculates a first amount of the memory available on the image reproduction device to render the intermediate print data, the calculating of the first amount being based on the fixed amount of memory on the image reproduction device less a second amount of the memory needed by the image reproduction device to store the intermediate print data. On the host device a determination is made of a subset of the drawing instructions as complex drawing instructions of the intermediate print data. The host device renders the complex drawing instructions to simpler drawing instructions. For the one or more regions associated with the determined complex drawing instructions, the method reassociates the one or more regions with the corresponding simpler drawing instructions to form altered intermediate print data which can be rendered on the image reproduction device within the determined first amount of memory. The method transmits print instructions, including the altered intermediate print data, from the host device to the image reproduction device for rendering to pixel data within the fixed amount of memory on the image reproduction device.

Desirably the determining comprises: determining, for each drawing instruction, a working amount of the memory that is required to render the drawing instruction; and deeming the drawing instruction to be complex where the determined working amount of memory exceeds the calculated first amount.

Where the working amount of memory and the second amount of memory is less than the fixed amount of memory, resulting in potentially unused memory, the method preferably uses the unused memory to increase performance of the rendering of the drawing instructions on the image reproduction device.

Advantageously the size and quality of image data is reduced until of the altered intermediate print data is small enough to fit in the memory of the image reproduction device. Typically the reduction of the image data comprises compressing the image data. The method may further comprise rendering, where the altered intermediate data is too large to fit in the memory of the image reproduction device, the intermediate data to a single image such that the drawing instructions comprise the rendered single image. The rendering of the intermediate data may comprise rendering the altered intermediate data.

Advantageously the intermediate format comprises a fillmap data structure. Generally the image reproduction device comprises a printer device.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Context

Figure 1:
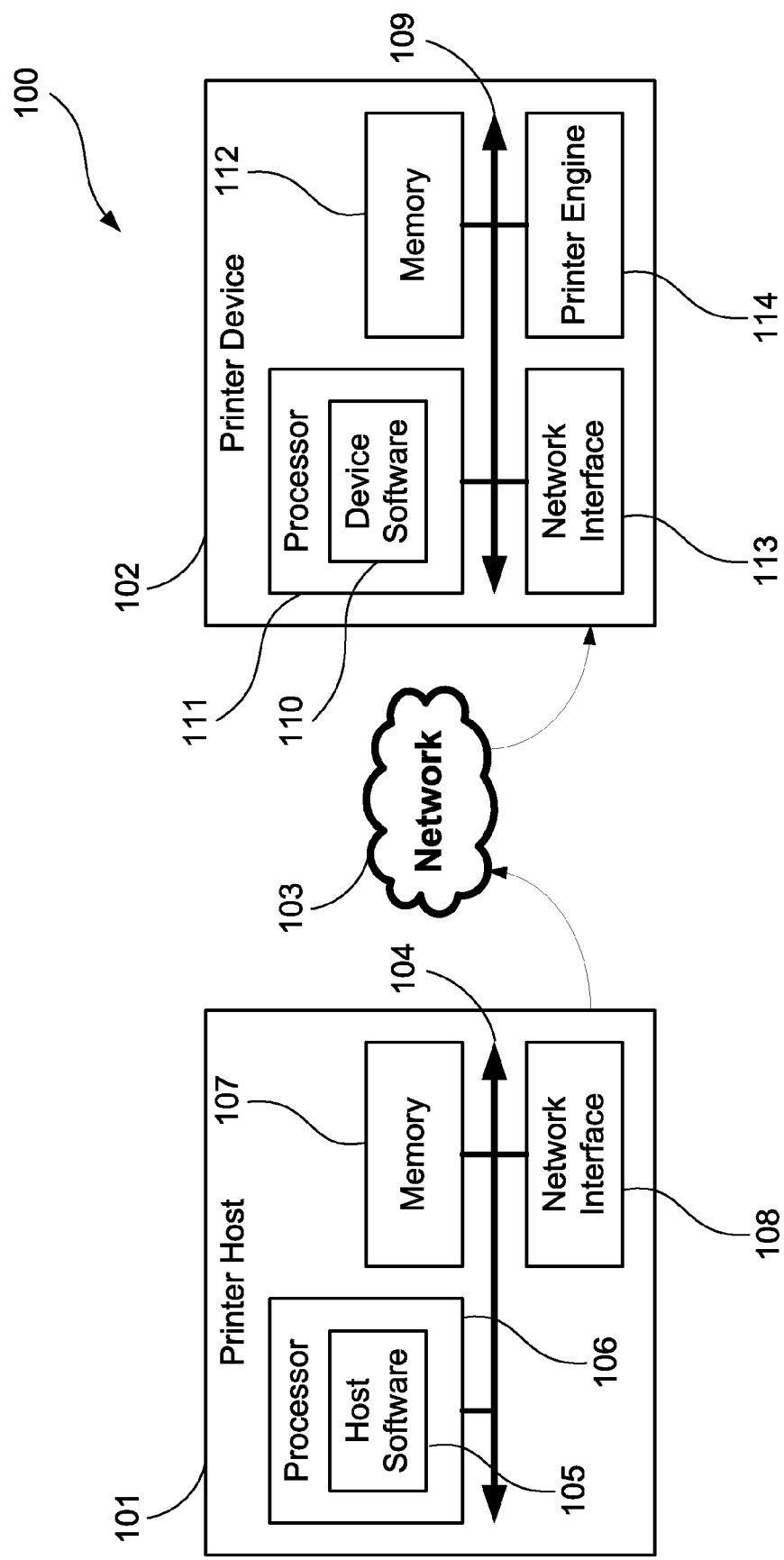
FIG. 1 is a schematic block diagram showing the architecture of a split printing system.

Print rendering systems are normally provided with a source document in a page description language, for example Portable Document Format (PDF), developed by Adobe Systems Inc. Such systems generate pixel output that is suitable for sending to the printer hardware for drawing on the output medium.

A simple system may for example take drawing requests or instructions from the PDL and render the drawing instructions directly into a full-page frame-buffer. A typical method for performing this is known as Painter's Algorithm. Alternatively, the data can be rendered by converting between one or more intermediate formats. The present disclosure relates to a type of system that uses a specific intermediate format, known as a fillmap data structure, or simply a fillmap.

Such a system 100 is illustrated in FIG. 1. A printer host 101 comprises host software 105 running on a processor 106, memory 107 and a network interface 108, all connected to a local bus 104. The software 105 is typically stored in the memory 107. The printer host 101 accepts PDL data from a document creation application (such as a word processor or web browser, for example) and converts the PDL data to intermediate format data, known as a fillmap. The fillmap is transmitted via the network interface 108 and a connected network 103 to an image reproduction device, such as a printer device 102. By virtue of the configuration of the network 103, the host 101 and the device 102 are typically remote from each other. For example, the host 101 may be a server in a cloud computing environment and the printer device 102 may be located in an office or a private residence.

The network 103 is a typically a communications network such as a local area network, a wide area network, and may be implemented in a wired form, a wireless form, or a combination of the two. By means of such a network 103, there will generally be at least one intervening communications device, such as a router, switch or node, interposed between the host 101 and the print device 102. In some instances, the network 103 may be formed by a simple direct connection between the host 101 and the print device 102, such as a single cable connection or, for example a Bluetooth™ wireless connection.

The printer device 102 comprises device software 110 running on a processor 111, memory 112, a network interface 113, and a printer engine 114, all connected to a local bus 109. The printer device 102 receives the fillmap data via the network interface 113 and renders the fillmap data to output pixel data that is passed to the printer engine 114 for hard copy reproduction.

The host software 105 is typically stored in the memory 107, which is also used for temporary storage of data during the processing performed within the host device 102. Typically the memory 107 is formed by a combination of memory types including read-only memory (ROM), non-volatile random-access memory (RAM) and volatile RAM. Often, for notebook, desktop or server (e.g. cloud) computing implementations of the host 101, the non-volatile RAM may be formed by magnetic disk drive or similar storage device. For highly portable implementations, such as where the host 101 is a smartphones or tablet device, or the like, the non-volatile RAM is typically formed by silicon devices implementing a so-called solid state hard drive (SSHD). As such the memory 107 includes or is formed by non-transitory tangible computer readable storage media within which the host software 105, at least, may be stored. Particularly in the cases of highly portable devices, whilst the (SSHD) memory may be of limited capacity when compared with desktop or server computers, such memory capacity is almost always substantially greater than that of the memory 112 of the printer device 102, and thus does not limit printing operations. The host software 105 may be supplied to the printer host 101 for such storage via portable non-transitory tangible computer readable storage media connectable to the printer host 101, or via transitory non-tangible computer readable transmission media, including for example the network 103.

The device software 110 is typically stored in the memory 112, which is also used for temporary storage of print data during the processing performed within the printer device 102. Typically the memory 112 is formed by a combination of memory types including read-only memory (ROM), non-volatile random-access memory (RAM) and volatile RAM. Quite often the device software 110 is stored in ROM and cannot be altered after manufacture without replacement of the ROM. Where the device software 110 is stored in non-volatile RAM, such affords the possibility of upgrades or changes to the device software 110 from time to time, provided sufficient memory capacity is available. In some instances the non-volatile RAM may be formed by magnetic disk drive or similar storage device. As such the memory 112 includes or is formed by non-transitory tangible computer readable storage media within which the device software 110, at least may be stored. The device software 110 may be supplied to the printer device 102 for such storage via portable non-transitory tangible computer readable storage media connectable to the printer device 102, or via transitory non-tangible computer readable transmission media, including for example the network 103.

Figure 13:
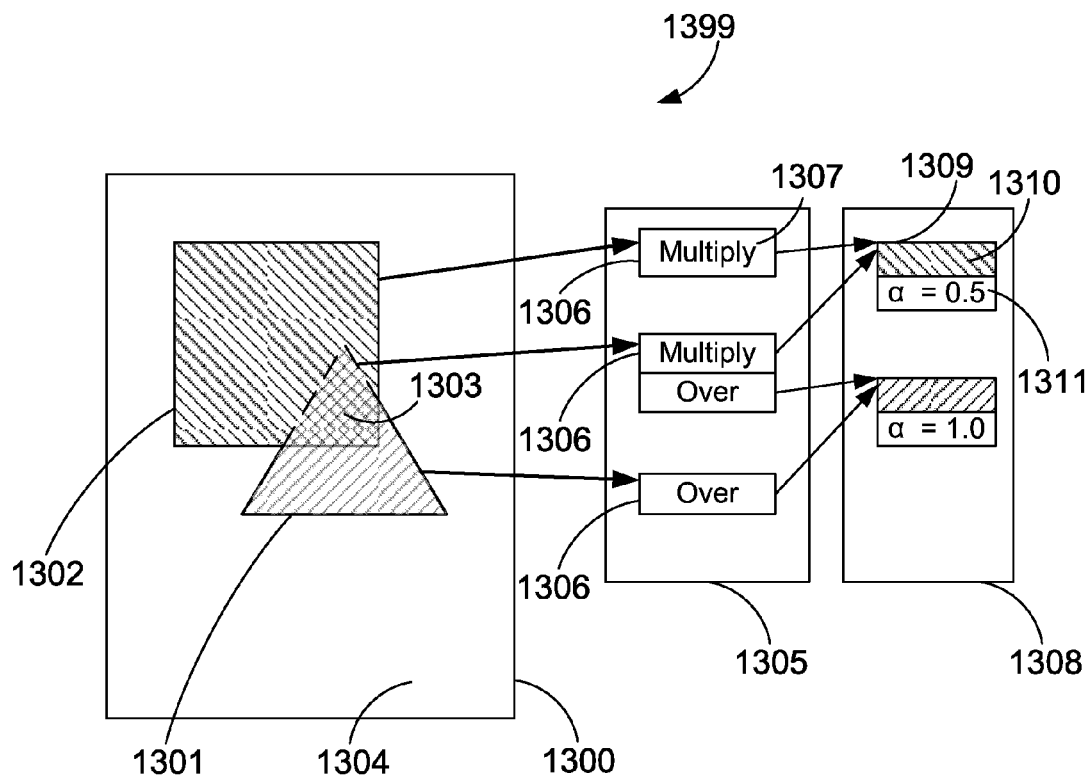
FIG. 13 is an illustration of the structure of a fillmap.

A fillmap describes the content of a single page in a print document. The structure of a fillmap 1399 is illustrated in FIG. 13. In the fillmap 1399, the content of a page 1300 to be reproduced by printing is divided into non-overlapping regions 1301, 1302, 1303, including background regions 1304. Each region of a fillmap is an area containing a particular combination of contributing PDL objects. The extent of the each region is described by edges that are aligned with the pixel grid able to be printed by the print engine 114. The content of each region 1301-1303 is defined by a set of compositing stacks 1305. In this example, there is no compositing stack illustrated for the background region 1304 as such can be assumed in the OVER operation 1306 associated with the lowest z-order object level. Other implementations may insert an entry representing the background in the compositing stack. Each compositing stack is an ordered list of level appearances 1306, each of which corresponds to an object that contributes to the appearance of the corresponding region. Each level appearance 1306 references either a single fill or a group of fills in a fill store 1308, generally formed within the memory 107. The level appearance 1306 also defines one or more compositing operations 1307 that are used to draw the group or object on the underlying objects. In the example of FIG. 13, the compositing operations Multiply and Over are used by the three level appearances 1307. A fill 1309 describes the colour 1310 and alpha 1311 for the pixels of the object and the collection of fills 1308, the regions on the page 1300 and the compositing stacks 1305 form the fillmap 1399 for the page 1300. Fills include flat regions of colour, linear and radial gradients and images. For example, a fill could consist of a red colour, a level appearance could composite the red fill on an underlying object using the "Multiply" blend mode, and the compositing stack would comprise the red level appearance along with the level appearances of the underlying objects. In summary, as shown in FIG. 13, the structure of the fillmap 1399 may be considered an intermediate format which uses non-overlapping regions that reference compositing stacks that in turn reference fills for a page where, preferably edges associated with objects are pixel-aligned.

Fillmaps as an Intermediate Format

Now described is a print rendering system that uses fillmaps as the intermediate format.

Figure 2:
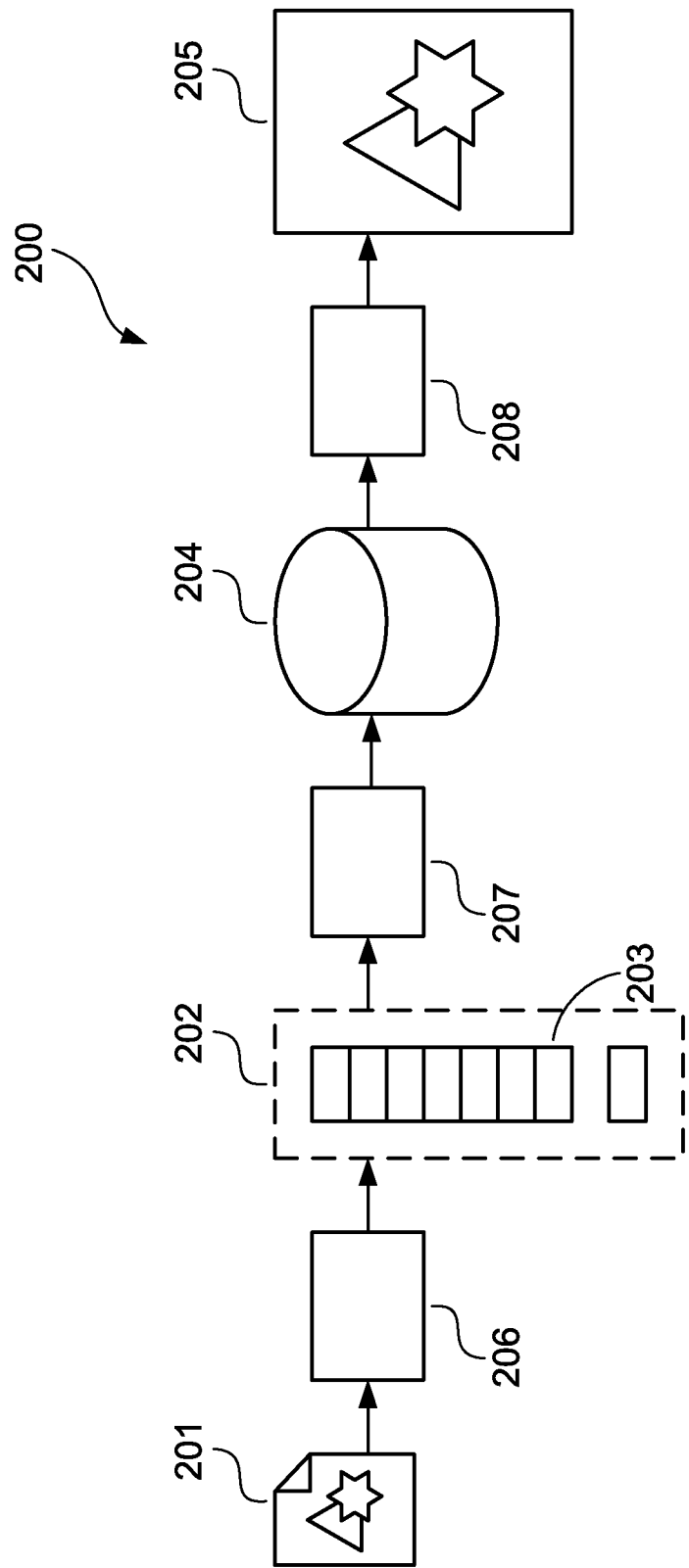
FIG. 2 is a diagram showing the flow of data from the page description language to output pixels.

FIG. 2 is a diagram showing the high-level processing flow of an example of a fillmap-based print rendering system 200. A print document 201 is provided to the system 200. The document 201 contains page description language (PDL) data. Examples of PDLs include PDF, PostScript and XPS. The print document 201 is read and processed by a PDL interpreter (PDLi) 206. The PDLi 206 converts content of the document 201 into a sequence of drawing instructions. These drawing instructions are accumulated in one or more z-ordered Display Lists 202. An entry 203 in the display list 202 can represent a drawing instruction. The display list 202 is then passed to a Fillmap Generator module 207 which converts the data into a fillmap intermediate format 204. When all the display lists for a page have been received by the fillmap generator, the fillmap 204 is passed to a Fillmap Renderer 208, which renders the fillmap 204 into a page of output pixel data 205 that is passed to a print engine for hard-copy reproduction.

The system 200 is now described in more detail in the following sections.

Display List Generation

The process of display list generation, performed by the PDLi 206 takes a sequence of drawing instructions from the PDL document and turns them into a list that can be easily manipulated. The available types of drawing instructions are independent of the PDL. This allows different PDLi implementations to provide data to the same system. Examples of these generic drawing instructions include:

(i) Providing global information about the page content, for example the page size, page affine transformation, colour space information and device resolution;

(ii) Drawing an object on a page, by specifying the shape, stroking and/or filling content, optional clip data of the object, and a compositing operation that defines how the object composites with any objects underneath in the z-order of the page; and (iii) Creating a group of objects. A group has a set of properties that apply to all member objects of the group.

Each object that is drawn onto a page is added to a Display List. Each display list entry contains information about the shape, colour, and the compositing operation of the object. The compositing operation specifies how the object should be drawn over any underlying objects on the page.

The object shape can be defined by a set of paths or glyphs (a symbol or character). The shape can be stroked, filled, or both stroked and filled.

Similarly, an object can have optional clipping information, which is also supplied by a set of paths or one or more glyphs. The clipping information restricts the visibility of a clipped object. In a preferred implementation, clipping boundaries may be represented as display list entries that refer to the display list entries which they clip. In an alternative, each clipped display list entry has a reference to the clipping boundaries that clip the display list entry.

The colour appearance of a filled area or stroked path is provided by a Fill definition. There are various types of fills, including:

(i) A region of solid colour, or Flat;

(ii) A region of colour interpolated between two geometric points and their associated colours, known as a 2-point gradient;

(iii) A region of colour interpolated between three geometric points and their associated colours, known as a 3-point gradient;

(iv) A region of colour interpolated between more than two collinear geometric points and their associated colours, known as a multi-stop gradient;

(v) A region of colour interpolated between two geometric circles and their associated colours, known as a radial gradient; and (vi) A region of colour defined by an image. An image can be a single instance or it can be repetitively tiled across and down the page at any angular orientation.

The colour values that are used to define fills are supplied in an Input Colour Space. This may be different to the Render Colour Space of a page, which defines the colour space in which the compositing and rendering operations must be performed. As a result, fills may need to have the colours converted from the input colour space to the render colour space. This can be done on an as-needed basis during rendering, or alternatively it may be possible to perform the conversion when the fill is received from the PDL interpreter 206.

Fills also have opacity information, or alpha. This can be constant for the whole object, or can vary in a similar way to the colour information of a fill.

Finally, an object also has a compositing operation. This defines how the object interacts with any content drawn beneath the object. The compositing operation can use the colour and opacity of the object, as well as the colour and opacity of the underlying content. An example of a compositing operation is "Color Dodge" blend mode defined in PDF, where an object can be used to lighten the colour in an underlying object.

A common method for storing this object information is to add the details to a data store and reference them using an identifier. One advantage of this approach is that multiple copies of the same data can be combined into a single identifier, with a reduction in memory usage.

In the arrangement of FIG. 2, the fill and compositing information is combined into a single entity known as a level appearance (LA). An LA can be thought of as the non-shape component of the object description. In this implementation, each display list entry comprises:

(i) A reference to the object's shape (paths or glyphs);

(ii) If the entry is a clip path, then a reference to the other object(s) the entry clips; and (iii) A reference to the object's level appearance (fill and compositing operation).

A level appearance can be a member of a group or of a group nested within another group. In this case the level appearance data includes a reference to information about the properties of the group. The group is then used to control one or more aspects of the members. For example, a group could impose an affine transform on all its members. Alternatively, a group can define a separate colour space that the group members should be composited in.

A group can also be "tiled", where content of the group is repeated across and down the page at specified repetition intervals. This is a simple way to construct repeated patterns on the page. The usual method for rendering tiled groups is to draw the group members across and down the page at the specified repetition intervals. For example, the objects that form the repeated pattern are individually added to the display list at each position in which they appear. However, if the repetition interval is very small, this can lead to a large number of objects being drawn on the page. In this case, a more efficient solution that saves processing time and that typically reduces memory consumption is to replace the group with an image that represents the rendered contents of the group. This image is then repeated across and down the page.

Image Fill Storage

Images are a special case of fills. Because image data can be very large, special techniques are required to store and manage images when creating and processing display lists. Now described is one approach that implements some of these techniques.

When an image fill is received from a PDL interpreter, the image fill is saved in a compressed, tiled format. This allows individual tiles to be retrieved and decompressed, resulting in a lower memory overhead during rendering. This is especially important if the image is rotated with respect to the page. The compression method chosen is determined by examining the pixel colour data within each tile. The compression method can be lossless, lossy, or a combination of lossless and lossy in different locations. The implementation of lossy compression uses a variation of DCT encoding as used in the JPEG compression algorithm. This variation organises the compressed data in quality partitions, where the partitions are arranged in order of decreasing visual significance. This data organisation allows the system to easily decrease storage size by truncating the compressed data. This approach to managing image data is described in more detail in U.S. Pat. No. 8,411,942 (Chen et al.) granted Apr. 2, 2013.

Certain document production software can create a very large number of small images that are intended to cover a large area of the page. As a result, the print system must store a large number of image fills, with their associated level appearances and compositing stacks. When there are a large number of contiguous, non-overlapping images with the same colour characteristics it can be more efficient to combine them into a single image fill, with one associated level appearance and compositing stack. One method to achieve this is to detect this condition during display list generation. When the system receives similar contiguous, non-overlapping images it can accumulate them into a new single image that contains all the image data. The smaller images are discarded and the new image is then used to create the final page content.

Glyph Storage

When constructing display list 202 as part of the process shown in FIG. 2, text comprising a series of glyphs may be placed in the display list 202. For the fillmap generator 207 to scan convert the glyphs, the shapes of each glyph must be obtained from a font engine. Display list 202 is also shown at 1202 in FIG. 12, with reference to which, a method of storage of glyphs shall be discussed.

Since identical glyphs often occur repeatedly on one page, it is advantageous to store only one instance of each unique glyph shape in a glyph cache. Each instance of a plurality of instances of the same glyph in the display list can be represented by a reference to the unique glyph shape stored in the glyph cache, along with position information identifying where in the output the instance of the glyph is to be translated. In display list 1210, for illustrative purposes, four glyphs 1211, 1212, 1213 and 1214 are shown, referring respectively to cached glyph shapes 1201, 1202, 1201 and 1203. Two glyphs 1211 and 1213 are instances of the same cached glyph shape 1201 but which appear on different positions in the image represented by display list 1210.

Figure 12:
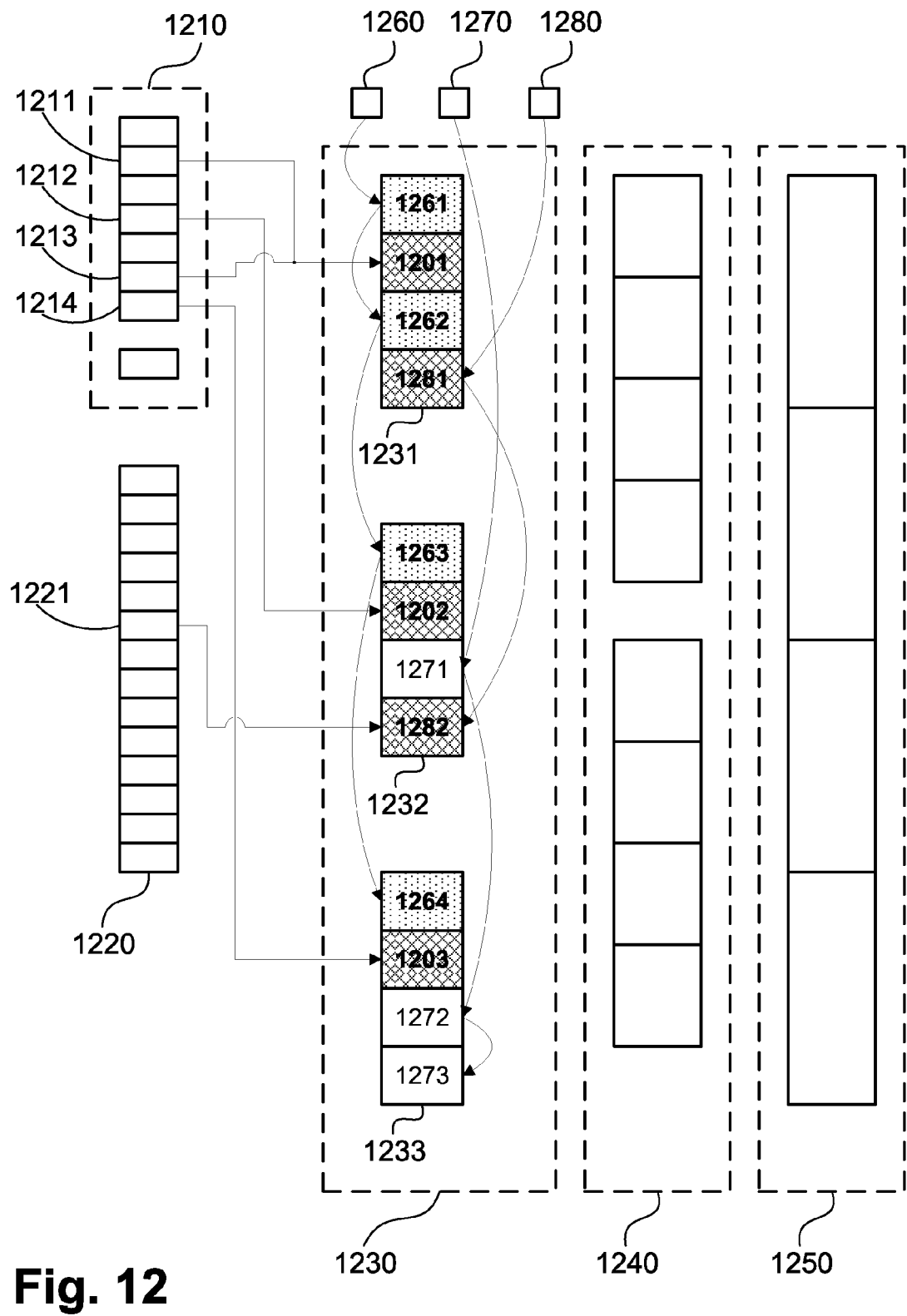
FIG. 12 is an example illustration of the structure of a glyph cache.

A glyph cache can store glyphs in several formats. Common formats include paths comprising lines and curves defined by control points, bitmaps, and run-length encoded bitmaps. In the preferred embodiment, small glyphs are represented by bitmaps, while larger glyphs are represented by paths, thus tending to reduce overall memory usage. Furthermore, in order to reduce time overheads associated with memory allocation, bitmap glyphs are grouped into various sizes and allocated from arrays. For example, small glyphs up to, for example, 100 bytes in size can be allocated from an array 1231 of 32 lots of 100 byte slots (only four slots per array are shown in FIG. 12 in order to reduce the complexity of the illustration). When storage requirements for small glyphs have exceeded the size of the array, a second array 1232 of 32 lots of 100 byte slots is allocated, and so on, resulting in a group of arrays 1230 shown in FIG. 12. Similarly, medium size glyphs up to, for example, 250 bytes, can be allocated from arrays 1240 of 32 slots of 250 bytes. Similarly, large glyphs up to, for example, 1000 bytes, can be allocated from arrays 1250 of 32 slots of 1000 bytes. The number of groupings and choice of slot sizes should be chosen so as to optimize overall memory usage, and the numbers presented above are for illustrative purposes only and may not be optimal in any particular implementation.

A typical glyph cache also has a hash table 1220 for assisting in identifying whether or not a requested glyph resides in the cache. When a glyph is added to the display list, the hash table is searched to efficiently find out whether or not the glyph is already cached. If the glyph is found in the hash table, then the cached glyph is already available for use in the display list. If the glyph is not found in the hash table, then the glyph is first obtained from the font engine and added to the glyph cache and to its hash table before being added to the display list. For example, if a glyph with a shape corresponding to glyph 1282 were to be added to the display list, hash table 1220 would be searched to find the glyph available at position 1221 in the cache. Not all cached glyphs are shown in the hash table 1220 in order to simplify the illustration of FIG. 12. In a preferred implementation, all glyphs stored in array groups 1230, 1240 and 1250 require an entry in the hash table 1220 so that they can be found whenever they are needed for a new display list entry.

The unused slots in each group of arrays, namely, for small, medium and large glyphs, are linked into free lists for glyphs of respective size. When a glyph is no longer needed and released from the cache, the slot in the array in which the glyph was stored can be added to a free list 1270 so that the slot can be used for another glyph whenever a new glyph of appropriate size is encountered. In FIG. 12, free list 1270 contains slots 1271, 1272 and 1273, ready for allocation to new glyphs should they be added to the display list 1210.

It will be appreciated that allocating from an array is a constant-time operation, and can be much more efficient than calling a system allocator to allocate each glyph individually. Similarly de-allocation by returning an element to an array is also more efficient than calling a system allocator.

Some glyphs can occur in multiple consecutive pages, as, for example, in a multi-page document composed of glyphs from the same font. It is therefore advantageous to retain the glyphs stored in the glyph cache while processing continues from page to page. Even if a glyph used on a first page is unused on a second page, it is worthwhile retaining it in case it will be used in a third page. However, it is unwise to store all unused glyphs indefinitely on the off chance that they will be needed, because of the impact on memory usage. Therefore, glyphs that have been unused for more than a predetermined number of pages are de-allocated and the slots they use are made available for new glyphs. However, if a complete array of slots is freed, then the entire array is returned to system memory.

The above process is implemented by use of a list of unused glyphs 1280, which are either ordered or grouped in a way to indicate their age. As a glyph becomes unused because it is no longer stored in any display list, it is immediately added to the unused list. If an unused glyph becomes used again, it is removed from the unused list. If a glyph has been left in the unused list for more than a predetermined number of pages (or some other suitable measure of age), the glyph is de-allocated. In FIG. 12, unused glyph list 1280 contains glyphs 1281 and 1282 which are not currently in the display list, but which are present in the cache because they had been used in the recent past. If an instance of glyph 1282, for example, were to be added to the display list 1210, it would first be looked up in the hash table 1220, where it would be found at hash table entry 1221, along with a reference to the data 1282 defining the shape of the glyph. A reference to glyph 1282 can be added to the display list along with information indicating the position of the glyph in the image represented by the display list. Glyph 1282 would be removed from the unused glyph list 1280.

In some situations, particularly in environments with low memory, it is preferable to place a limit on the memory used by a glyph cache to avoid retention of an indefinite amount of data representing glyphs that may only be used on one or a few occasions. In these environments, when the total memory used by glyphs in the cache exceeds a predetermined limit and there are unused glyphs, then enough unused glyphs are released starting with the oldest unused glyphs until either the memory limit is satisfied or all unused glyphs have been released.

It can be observed that when an unused glyph is released from the glyph cache, one of two things may happen. If the glyph occupies the only used slot in an array, then the entire array is de-allocated. If, on the other hand, at least one other slot in the array is occupied by a glyph that is currently in use in a display list, then the data defining the shape of the released glyph is still retained in the array. In this situation, the slot associated with the released glyph is available for allocation for a new glyph if needed. However, if the released glyph itself is newly called for, then the released glyph can be reinstated more quickly by using the retained data in the array slot than by requesting the data afresh from the font engine. Thus the ability to reinstate released glyphs when their data still resides in memory is advantageous.

To implement reinstatement of released glyphs, glyphs which are deleted are placed on a released glyph list, which is separate to the conventional free list for slots without stored data. Operations on glyphs proceed as per the following four numbered paragraphs.

1. When a glyph is released and the array in which the glyph resides cannot yet be released because array contains unreleased glyphs, the released glyph is placed on the released glyph list 1260. In the example in FIG. 12, released glyph list 1260 contains glyphs 1261, 1262, 1263 and 1264.

2. When a glyph is released and, as a result, the array in which the glyph resides now contains only free slots and released glyphs, then the array is de-allocated by returning the memory locations of the array to system memory, being part of the memory 107, and all released glyphs in that array are removed from the released glyphs free list and removed from the hash table. For example, if, in FIG. 12, glyph 1203 in array 1233 were to be released, all slots in array 1233 would be either free (1272, 1273) or released (1264, 1203). Array 1230 could then be de-allocated.

3. When a released glyph becomes used again, then the released glyph is removed from the released glyphs free list. For example, if glyph 1261 in array 1231 were to be used, the information that is retained in slot 1261 of the array 1231 would be available for reinstating the released glyph without requiring to invoke the font engine to generate the glyph data again, thus gaining efficiency of operation.

4. When memory for a new glyph is required, the conventional free list is checked first. If the conventional free list is empty and there is a slot in the released glyph free list, then the latter is used for the new glyph and the released glyph is removed from the hash table. In the example of FIG. 12, free list 1270 is has slots available, so the slot of a released glyph list 1260 does not need to be overwritten with a new glyph. However, should free list 1270 become empty due to allocation of new glyphs, then memory for further new glyphs would be allocated from slots in released glyph list 1260 in preference to allocating more system memory. Should both the free list 1270 and released glyph list 1260 become empty and more memory for glyphs is required, then a new array is allocated from system memory and added to array group 1230.

Other variations and adaptations of this method may be made without departing from the intended scope of this disclosure. In one alternate implementation, the glyph cache can have separate unused lists for glyphs which are known to have scope limited to a currently processed page or a currently processed document. Whenever processing of a page is complete, all glyphs with scope limited to the page can be de-allocated and placed on the free list. Similarly, whenever processing of a document is complete, all glyphs with scope limited to the document can be de-allocated and placed on the free list. If as a result an entire array consists entirely of free and released glyphs, then the array can be de-allocated and returned to system memory.

Fillmap Generation

Now described is the conversion of a display list to a fillmap. A fillmap is generated by processing display list objects in increasing Y-order (i.e. from the top of the page to the bottom). A fillmap is a device-resolution data structure. That is, the spatial data within a fillmap (the edges that delineates the page into regions) are aligned with the pixel grid used by the print engine. Consequently, a fillmap created for a specific device resolution (e.g. 600 dpi) cannot be rendered on a print device which has a different resolution (e.g. 1200 dpi). The data within a fillmap can cover the top-left printer device pixel through to the bottom-right pixel. Alternatively, the fillmap may only be defined for part of a page, if the content does not cover the whole page.

Before processing, all objects in the display list are sorted in Y-increasing order. That is, entries in the list are ordered so that objects that start nearer the top of the page appear before objects that appear further down the page. The shape information for each entry in the display list is expanded into one or more sub-paths. The shapes for a text object are first obtained from a font engine before being placed into the display list.

The fillmap generation loop starts at the first scan line in the printer page output. Processing continues one scan line at a time until all the objects in the display list have been processed, or the bottom of the page is reached. At each scan line, the display list is consulted. Any sub-paths that start on the current scan line are expanded into Y-monotonic edges. Y-monotonic edges are edges that only increase in the Y direction, i.e. edges in fillmap do not decrease in Y direction. Any edges that start on the current scan line will be expanded into a set of straight-line vectors. Curved edges are vectorised such that the difference between the curved edge and the resultant straight-line vectors is below the resolution of the output device. Vectorisation can be performed on an "as needed" basis, where the conversion to vector form only happens when the vector is required for the current scan line. Where an edge represents a stroked edge with a non-zero width, the result of vectorisation will be a set of vectors that track the two sides of the edge.

Figure 3A:
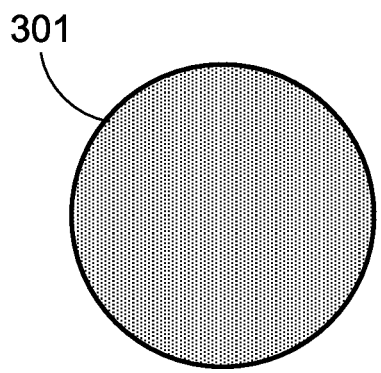
FIGS. 3A to 3C show the steps in breaking an object down into sets of y-monotonic straight-line vectors.
Figure 3B:
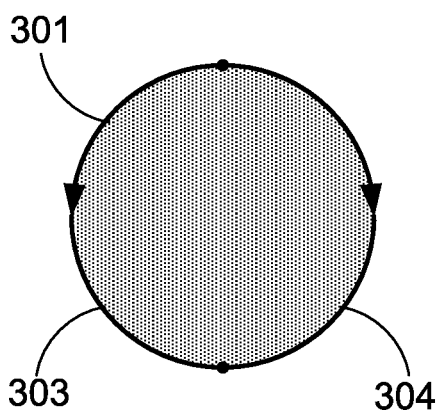
Figure 3C:
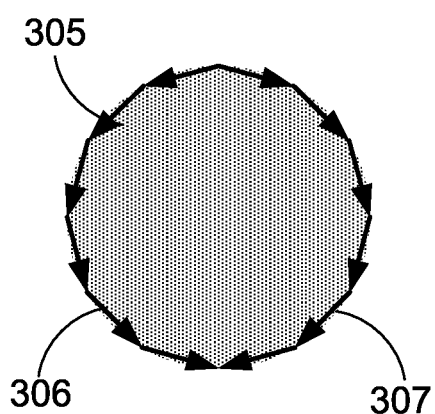

The process of vectorisation is shown in FIGS. 3A, 3B and 3C. Initially in FIG. 3A, a disk 301 is drawn on the page. As seen in FIG. 3B, the boundary of the disk 301 has its edge broken into two Y-monotonic edges 303 and 304. FIG. 3C shows the vectorisation 305 of the edges 303 and 304. Each edge has been converted into two sets of straight-line vectors 306 and 307.

Once an edge has been converted into vectors, the scan conversion process is performed on the vectors. Scan conversion is the process of converting vectors in the page coordinate system to fillmap edges that are aligned with the pixel grid of the output device. The determination of the pixel edges is based on the current pixel placement rule, which defines the pixels that are considered to be "inside" a shape. Two examples of pixel placement rules are:

(i) Grid Intersect, where boundary pixels are considered inside if the centre of the pixel is inside the shape; and (ii) Area Intersect, where boundary pixels are considered inside if they touch any part of the shape.

Figure 4A:
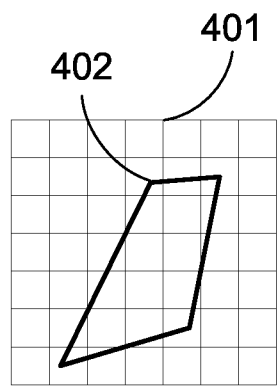
FIGS. 4A to 4C show the effects of different pixel placement rules when scan-converting a polygon to device pixels.
Figure 4B:
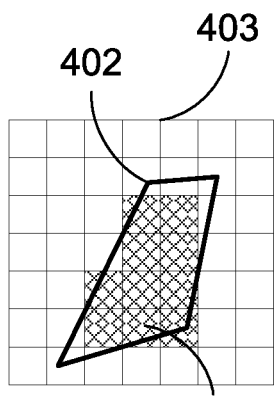
Figure 4C:
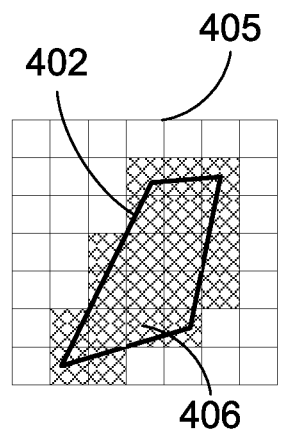

These rules are illustrated in FIGS. 4A, 4B and 4C. FIG. 4A shows a shape 402 that is to be aligned with the device pixel grid 401. In FIG. 4B, a device grid 403 includes pixels 404 that are considered to be inside the shape 402, as defined by the grid intersect rule. Only pixels whose centre point lies inside the shape are considered to be inside. In FIG. 4C, a device grid 405 shows includes pixels 406 that are considered to be inside the shape 402 as defined by the area intersect rule. According to the area intersect rule, all pixels which touch the shape are considered to be inside. Note that the fillmap edges are constructed differently depending on whether the edge is an enabling edge or a disabling edge. An enabling edge defines a region that is located on the right hand side of the edge. A disabling edge defines a region that is located on the left hand side of the edge. The shape of an object is defined by one or more pairs of enabling and disabling edges.

It should also be understood that pixel placement rules are applied differently if the page content is rotated by multiples of 90 degrees. For example, in 2-up printing the page content is rotated by 90 degrees. For consistent output, the pixel placement rules must also be rotated by the same factor.

Figure 5:
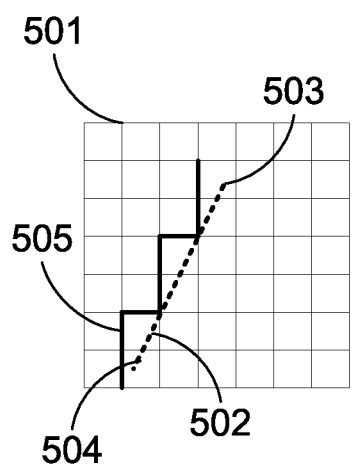
FIG. 5 is a diagram showing the scan-conversion of a single enabling edge using the area-intersect pixel placement rule.

The scan-conversion process considers each vector in turn and converts the vector to pixel edges as defined by the pixel placement rule. This is illustrated in FIG. 5. A vector 502 within a pixel grid 501 needs to be scan-converted. The vector 502 is defined by a start point 503 and an end point 504. A pixel-aligned fillmap enabling edge 505 corresponding to the vector 502 is shown. Note that this edge is an enabling edge and the pixel-placement rule in effect is the area-intersect rule.

Scan-conversion of each vector begins when fillmap generation processing reaches the first scan line which the vector can affect. The vector is then tracked for each scan line until processing reaches the final scan line which the vector can affect. For each scan line, the position of the intersection between the vector and the scan line must be calculated. There are various techniques which can be used, including Bresenham's algorithm, or solving the intersection in fixed or floating point calculations.

The tracking of many vectors over multiple scan lines is a computationally intensive process, and therefore optimising this process is important. One such optimisation is to track each vector for a batch of scan lines at a time, before moving to the next vector to process. Batch edge tracking is discussed in more detail in Australian Patent Publication No. AU 2010201321 A1 (Iskenderian et al.).

Once each scan line has been processed, the result is a set of x-intercepts, corresponding to the positions where each pixel-aligned edge has been created from a vector that intercepts the scan line. Each x-intercept is labelled with a "z-level" (the ordering of the objects as they are painted on the page), a "direction" (whether this is an enabling or disabling edge) and a level appearance reference. Note that there can be multiple pixel-aligned edges at the same x-intercept.

Once all the x-intercepts for a scan line have been calculate, Level Processing is performed. The purpose of this processing is to create a set of pixel-aligned fillmap edges corresponding to the x-intercepts. Each fillmap edge corresponds to the one or more x-intercepts at the same pixel. Associated with each fillmap edge is the set of level appearances that are active at the edge's position. This set of level appearances is ordered by z-level, and is known as a compositing stack. A compositing stack fully describes the colour and alpha appearance of a region, in this case the region associated with the edge.

The process of level processing is now described in detail. Firstly, the set of x-intercepts for a scan line is sorted into ascending order. A data structure known as the Active Level List (ALL) is created. This defines the levels that contribute to the appearance of a region on the page. It is initialised with a single "background" level. Each x-intercept is then processed in turn. If the x-intercept resulted from an enabling edge, the corresponding level appearance is inserted into the ALL at the appropriate z-level. On the other hand, if the edge is a disabling edge, then the corresponding level appearance is removed from the ALL. If an edge belongs to a clip path, then it instead controls the visibility of one or more associated levels in the ALL. When all the x-intercepts for each x coordinate have been processed, a new fillmap edge is generated for this position. The current content of the ALL is used to create a new compositing stack. This compositing stack is added to a compositing stack store, and the fillmap edge is tagged with a reference to the compositing stack. A useful optimisation for managing compositing stacks is to only store unique instances, and use a reference to associate the stack with each edge that refers to it. The processes of scan-conversion and level processing are discussed in further detail in U.S. Pat. No. 7,978,196 (Combes et al.) granted Jul. 12, 2011 and U.S. Pat. No. 7,561,303 (Groarke et al.) granted Jul. 14, 2009.

At the end of the scan line, there will be a set of fillmap edges for the scan line. This process is repeated on the following scan lines. As processing proceeds down the page these sets of edges for each scan line can be joined across the scan lines, leading to the creation of two-dimensional regions on the page, denoted by the fillmap edges. By the end of the page, the entire content has been converted to a set of device pixel-aligned regions, each of which references a compositing stack that describes the content. To reduce memory usage and to facilitate efficient rendering, the set of edges can be partitioned into tiles or strips, each piece is compressed separately and added to a store for later retrieval. The process for combining fillmap edges between scan lines is described in more detail in U.S. Pat. No. 7,724,974 (Koziarz) granted May 25, 2010.

Preparing a Fillmap for Rendering

Before a fillmap representing the page content is rendered, there are some preparation steps that are taken. These steps include preparing the compositing stacks for rendering, performing optimisations, checking that the fillmap is suitable for rendering on the particular printer device, and creating an image decompression schedule.

Firstly, certain complex level appearances must be converted to a renderable form. Some types of level appearances represent complex rendering operations that cannot be performed by the renderer. Instead they must be converted to one or more simpler operations. Some of the operations are known as raster operations (ROPs). An example of this is the ROP4 operation, which is normally converted to a pair of ROP3 operations followed by a combination operation. Another example of these simplification operations is the evaluation of PDF Knockout Groups. This process involves searching for any knockout groups and removing any level appearances that will be "knocked out" by a higher object in the group.

After the elimination of complex level appearances, compositing stack optimisation is performed. This involves examining the compositing stacks for optimisations that can be applied to optimise rendering. An example of such an optimisation is the replacement of flat compositing stacks. A flat compositing stack is one where all the level appearances are spatially independent. In such cases, it is possible to render the compositing stack down to a single flat colour and replace the stack with one that just contains this single flat colour level appearance. Other optimisations are possible.

At this point there may still be level appearances that cannot be rendered by the printer device. This could be because of restricted capabilities in a split-system printing device. For example, a low-cost printer may not support level appearances that require colorimetric colour space conversion. At this point in fillmap preparation, a check is made for any level appearances that cannot be rendered. If any instances are found, then the system 100 will need the printer host 101 to convert them to a form that can be rendered. A common method for this is to render the affected regions to an image and include the image as a backdrop in the fillmap. This is known as partial flattening. If partial flattening is required, then a new image fill is created; this will contain the rendered content. The image will be a device-resolution image that spans the area on the page covered by the fillmap. A level appearance and single-level background compositing stack is created to reference the new image fill. For each unrenderable level appearance in the fillmap, the system 100 identifies the referencing compositing stacks, and for the compositing stacks, the system identifies the referencing fillmap edges. The fillmap edges define the regions on the page that will need to be pre-rendered. For each region, the system renders the pixels into the background image fill. The edge is then updated to reference the new background compositing stack. At the end of this process all the unrenderable regions of the page have been replaced by references to the new background image. Level appearances, compositing stacks and fills that are no longer required can now be deleted, to save space.

Finally, there may be system constraints on the fillmap that mean the whole fillmap must be rendered to an image before being sent to a remote printing device 102. Examples of this could include the fillmap having too much edge data or compositing stack data, or the fillmap having a size that is too large for the device 102 (i.e. having a size that exceeds an available working memory capcaity of the device 102). A common solution for this is the render all the page information into a new bitmap and replace the entire fillmap contents with the new image. This is known as full-page flattening. If this is required, a new image fill is created. A level appearance and single-level background compositing stack is created to reference the new image fill. The entire page is then rendered to the fillmap. All the previously-existing regions, level appearances, compositing stacks and fills can then be deleted. The fillmap edges can be replaced with a single edge on the left hand side of the page that references the background compositing stack.

Partial and full-page flattening are described in more detail in later sections.

A final step in fillmap preparation is the construction of an image decompression schedule. When a fillmap is rendered to device output pixels, the system must decompress any referenced images to obtain the image content. A simple approach would be to decompress all image tiles before rendering starts, and to delete the memory at the end of the page. A disadvantage of this approach is that it can result in much more memory being used than is required. A better approach is to only decompress image tiles when they are required, and to delete the associated memory as soon as it is no longer required.

Fillmap rendering is performed in strips from the top of the page to the bottom. An image decompression schedule for a fillmap describes which tiles from each image are needed for each strip in the fillmap. At the beginning of each strip, the fillmap renderer consults the image decompression schedule to decide which tiles should be decompressed and which decompressed tiles can be freed. The decompression schedule can also allocate each tile to a location within one or more decompression buffers. The creation of the image decompression schedule is performed as part of fillmap rendering preparation.

Fillmap Rendering

Figure 6:
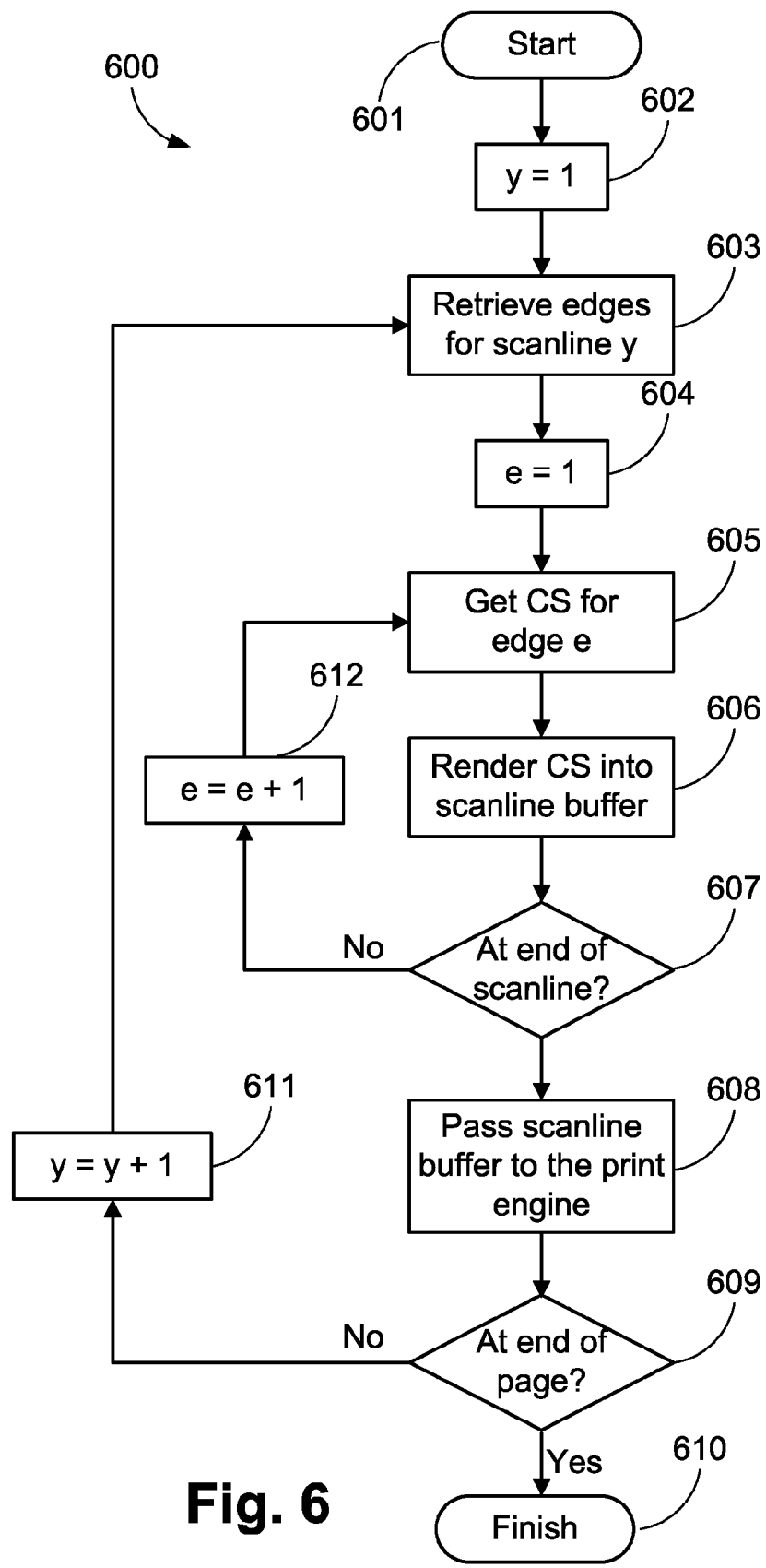
FIG. 6 is a flowchart of a high-level method for rendering a fillmap to pixel data.

As described above, the regions in a fillmap are delineated by edges that are aligned with the print engine's pixel grid. As a result, by the time rendering is performed, all output pixels have been assigned to a compositing stack. Therefore no geometric calculations are needed to determine the source of the colour information for the output pixels. FIG. 6 is flowchart illustrating the fillmap rendering process 600 performed by the renderer 208 of FIG. 2. The process starts at step 601, when a fillmap is ready to be rendered. The fillmap will be rendered one scan line at a time, starting from the top of the page. Step 602 initialises a loop for this sub-process by setting the row counter to the first row, after which the edges that intersect the current scan line are retrieved from the fillmap edge store 603. The scan line is rendered by considering each edge in turn from left to right, and generating pixel data for the span between the current edge and the next edge (or the end of the scan line). Step 604 initialises a loop for this sub-sub-process by setting the edge counter to the first value, after which the compositing stack associated with the edge is retrieved 605 from the compositing stack store. Creating pixel data for the edge span involves evaluating the compositing stack for each pixel 606. This is described in more detail below. If there are more edges in the scan line 607, then the edge index is incremented 612 and processing loops back to read the compositing stack for the next edge 605. Otherwise, the process 600 has finished rendering all the pixels for the current scan line, and it can be passed to the print engine 608 to be printed on the page. If there are more scan lines in the fillmap to be rendered 609, then the current row is incremented 611 and processing loops back to the edge retrieve step 603. Otherwise, the process 600 has finished rendering the fillmap 610.

The process 600 above describes rendering scan lines one at a time. There are other ways of processing the fillmap data that may be more useful in different systems. For example, the scan lines could be rendered in horizontal page-width strips, which are then passed to the print engine. This would allow the print engine to process a strip of data while the next strip is being rendered. Alternatively, the page could be divided into vertical page-height strips or tiles and each strip or tile rendered as a single entity, where this is a more efficient method of operation.

Figure 7:
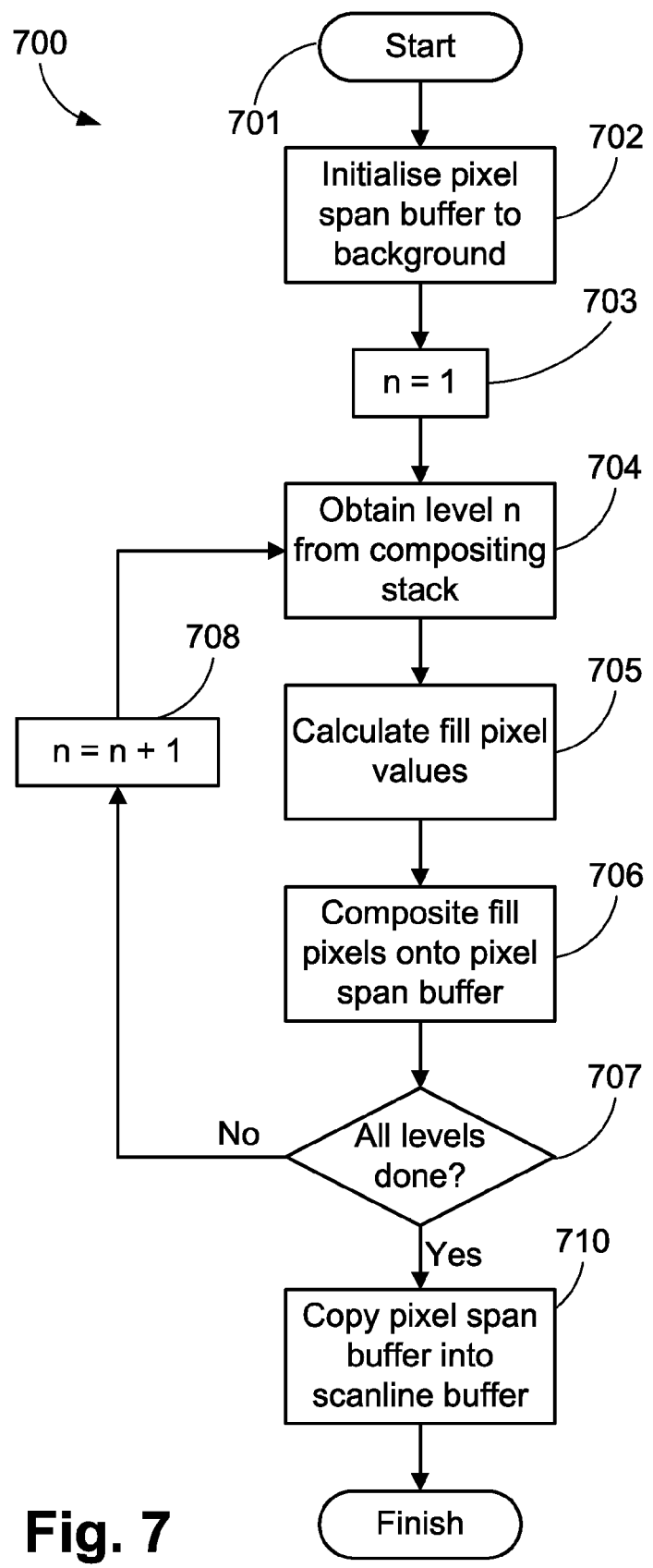
FIG. 7 is a flowchart of a method of evaluating a compositing stack for a pixel run.

A process 700 for evaluating a compositing stack for a span of pixels is shown in the flowchart of FIG. 7. The process begins 701 with a compositing stack that represents the contents in a span of pixels in a scan line on the page. The first step is to initialise a pixel span buffer with background colour values 702. The compositing stack is evaluated one level at a time, starting at the lowest level in the stack. Step 703 initialises a loop for this sub-process by setting the current level index to the bottom level 703. Next, step 704 obtains information about the level appearance for the current level. This includes the fill identifier and the compositing operation that should be used to composite the level with all lower levels. Using the fill information, a separate fill pixel buffer is filled with colour values 705. The values in the fill pixel buffer are then composited onto the pixel span buffer 706, using the previously-obtained compositing operation. If there are more levels in the compositing stack 707, then the current level index is incremented 708, and processing loops back to retrieve and process the next level 704. Otherwise, the process 700 has finished evaluating the compositing stack for the given pixel span. A preferred process for alpha compositing is described in more detail in U.S. Pat. No. 7,046,253 (Long et al) granted May 16, 2006.

As well as calculating colour and alpha values during compositing, it can be useful to maintain per-pixel attributes that designate non-colour information about the pixel. An example of an attribute that is useful to track is whether the pixel content is provided by text, graphics or image objects. This information is useful for controlling post-render processing operations such as half-toning or dithering. For example, a system may prefer to not perform half-toning on pixels representing text, in order to maintain legibility.

The process of compositing attribute values for each pixel is costly, and is many cases only a simplified result is needed. One such simplified attribute compositing method is described in detail in U.S. Pat. No. 7,113,309 (Furuya) granted Sep. 26, 2006.

It is possible to improve compositing performance by reducing the amount of duplicate calculations. In one implementation, buffers used to store fill pixel colour values and buffers used to store results from compositing operations have a flag that states whether the buffer contains constant colour. A constant colour is one that is the same value for each pixel. In such cases, there is no need to calculate every pixel value; only a single value is needed. If a compositing operation only references operands with constant colour, then the result must also have constant colour. In this case only a single value is calculated and the result has the constant colour flag set.

Another optimisation that can be performed is to avoid compositing calculations altogether for parts of the page which only contain a single level. Where there are regions on the page which have a single level composited on the default background, there is no need to perform the compositing operation. Instead, all that is needed is to generate the colour and alpha information from the fill. This results in a reduced number of calculations, and is beneficial when rendering jobs such as pages of simple text.

Fillmap Merging

Described above is a process of converting all the contents of a page to a fillmap representation. One variation of this process is to partition the page contents into multiple z-ordered groups of objects and to create a separate display list and fillmap for each group. These groups of z-ordered objects are known as z-bands. The combination of all these z-bands is a representation of the final page contents. In order to render the page, all the z-band fillmaps must first be merged into a single new fillmap. The process of combining multiple z-bands into a single fillmap is known as fillmap merging. The process of dividing the page contents in the z direction and merging the resultant fillmaps can be repeated many times until the final page representation has been created. One implementation of z-banding is to partition the page objects into fixed-size groups, for example, groups of 5000 objects, and to merge the z-bands once a certain number of z-band fillmaps have been accumulated. This use of z-bands can provide improved performance and lower memory usage compared to the creation of a single fillmap containing all the page objects.

The process of merging a set of z-band fillmaps will now be described. As has been described before, each fillmap is divided into tiles. Each tile contains edge data for the objects that overlap the tile. A tile which contains no objects is empty. The first step is to create a new fillmap that will contain the content of the z-band fillmaps that will be merged. Next, this fillmap is divided into merge regions. A merge region is a set of tiles in the new fillmap which will contain merged tile data from the same set of z-band fillmaps. Regions in the new fillmap that have no contribution from the z-band fillmaps are known as empty regions. Each merge region is now treated in turn. For each tile in the merge region, the corresponding tiles are retrieved from the related z-band fillmaps. The edges in these tiles are combined together to create a new tile that is then inserted into the new fillmap. Edge tiles are combined in increasing z order. As the edges are merged together, new regions are created. Each region will require an updated compositing stack that represents the new region content. The creation of this new compositing stack simply involves concatenating the compositing stacks from the original regions in the original z ordering. Once all merge regions have been processed, the original z-band fillmaps can be discarded. All references to fills and compositing stacks that are no longer required can also be deleted. An exemplary process of fillmap merging is discussed in further detail in U.S. Pat. No. 7,978, 196 (Combes et al.) granted Jul. 12, 2011.

Figure 8:
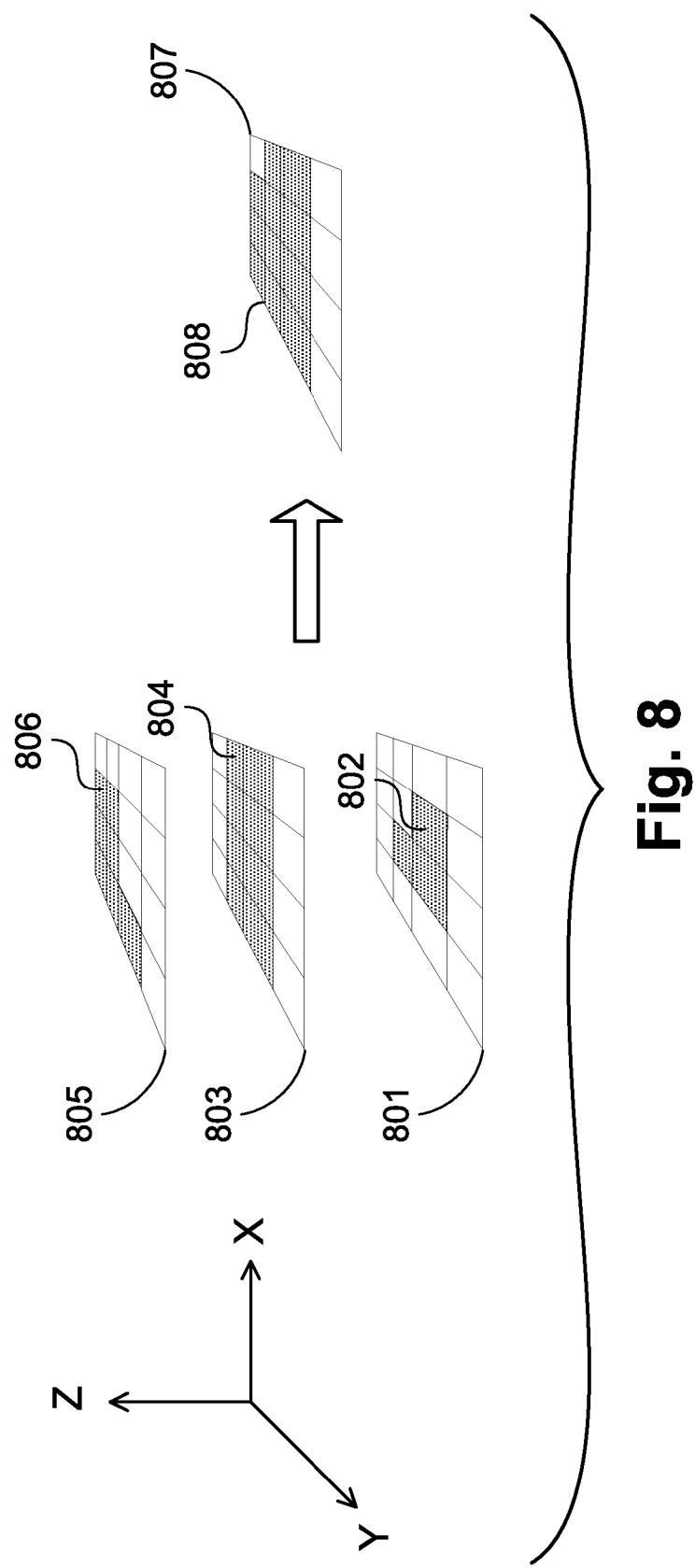
FIG. 8 is a diagram illustrating the process of merging three fillmaps into a single fillmap.

FIG. 8 shows an example of merging three z-band fillmaps into a single fillmap. In FIG. 8, a fillmap 801 contains for example the first 5000 objects on the page. These objects only cover part of the page. Fillmap tiles 802 that are not empty are shaded in FIG. 8. The next 5000 objects are contained in a second fillmap 803. The shaded fillmap tiles 804 contain data for these objects. Finally, the third fillmap 805 contains the remaining 1000 objects. The shaded region 806 shows the tiles that contain edge data for these objects. A fillmap 807 on the right shows the result after merging the z-band fillmaps. The tiles 808 in this fillmap that contain data are shown shaded. The set of tiles in the resultant fillmap that contain data is the union of the corresponding tiles that contain data in each of the z-band fillmaps.

Fillmap Serialisation

FIG. 1 as discussed above shows a printing system 100 that is split between host 101 and device 102 components. In such a split system, print data must be sent from the host 101 to the device 102. In the specific systems described herein, the print data that is sent is a fillmap, and the device 102 operates to render the fillmap and print the output. The fillmap is a complex data structure comprising fillmap edge tiles, compositing stacks, level appearances fills and other sundry objects. The actual memory layout and ordering of these data structures is dependent on both the processor and software build tools. The host 101 and device 102 parts of the system 100 may differ in one or both of these. As a result, fillmap data cannot be simply transferred from one system to another.

To send a fillmap from one processing environment to another, and thereby permit the fillmap to be operatively interpretable across a variety of environments of differing builds, the fillmap is first converted to a serialised fillmap format. This is a format that can be safely transferred to another environment, and reconstructed back into native data format. It is important that the serialised fillmap format does not include any hardware-specific formatting. For example, pointers cannot be included and byte-swapping may be necessary.

Implementation

The arrangement as illustrated in FIG. 1 is one that gives little guidance as to the capabilities of each component system, particularly that of the image reproduction (printer) device 102. As discussed above, the host 101 will generally have a computing capacity that far exceeds that of the printer device 102. Nevertheless, printers come is a wide variety of forms. For example, some very simple print devices have highly limited memory and essentially no processing (rendering) capability and can only print pixel data supplied by the host. At the other end of the spectrum, large "office" standard printers often have large memories, often formed using hard disk drives, and have substantial processing (rendering) capabilities, and are thus configured to handle highly complex and large print jobs. In the middle of the spectrum are a plethora of printers which have variable amounts of memory and varying amounts of rendering capability. It is that group of printers for which it is desirable to ensure that a print job can be printed. That is, the print job does not fail for want of memory and/or processing capacity in the printer, regardless of the size or complexity of the print job. The present disclosure is focussed upon an approach to printing that provides for printing success, regardless of the type of printer coupled to the host.

Spool Preparation—Flattening

According to the present disclosure, before the final fillmap for a page of a print job can be sent to the printer device 102, a determination is made about whether the final fillmap can be rendered on the printer device 102. This determination takes into account the capabilities of the software 110 and available memory 112 in the printer device 102. If the fillmap cannot be rendered by the device 102, then the fillmap is simplified so that the fillmap can be rendered by the print device 102. This process must take place on the printer host 101, as the host 101, even when implemented by a smartphone or tablet device, will most often have greater resources and capabilities compared with the printer device 102. The determination and simplification actions are now described in more detail.

Specifically, the printer device 102, including a make, model and version identification, which collectively identify the printer software 110, are each known to the host 101 through the installation of printer driver software as part of the software 105. Particularly, when the printer device 102 is "installed" as an available printer for the host 101, the printer driver for the printer 102 is installed on the host 101. The printer driver software includes information regarding the memory capacity and performance capability of the printer 102 which are then available to the host software 105 for modifying the fillmap(s) of a page to be printed to ensure that the printer device 102 can print the page.

Firstly, as the print device 102 may have limited capabilities, there may be parts of the print job that the device 102 cannot process. There can be various restrictions in device functionality, for example:

(i) The device software 110 could be from an earlier release (and not able to be altered), and therefore not support the latest fillmap features;

(ii) The ROM size within the memory 112 of the printer device 102 could be constrained meaning that some functionality is not available, for example, colour space conversion or complex gradient rendering; and (iii) Certain drawing operations could require call-backs to the PDL interpreter to be rendered.

Secondly, the print job may exceed some rendering limits, meaning that it is too complex to render on the device 102. As the printer device 102 usually has a relatively small amount of memory 112, it is necessary to ensure that the rendering process must be able to complete within a fixed amount of working memory. Examples where this may need to be taken into account include:

(i) The device software 110 may only be able to render fillmaps with an maximum upper size in the numbers of fills, level appearances or compositing stacks; and (ii) There may be an upper limit in the number of nested PDF transparency groups. Too many such nested groups can cause excessive amounts of compositing working memory to be required. During the rendering of a compositing stack the rendering code maintains a buffer of pixels containing the results of the compositing operations performed so far. When the start of a new group is encountered in the compositing stack, this pixel buffer must be "pushed" (i.e. saved on a temporary stack) and a new pixel buffer created to render the contents of the group. If a job has a large number of nested groups, then the stack of saved pixel buffers can become too large for the available working memory, and the print job will fail. One way to determine if a job could use too much working memory in this situation is to count the maximum depth of nested groups, and multiply this by the size of the pixel buffers. If this exceeds a predetermined amount of memory, then the composting stack is regarded as exceeding a device rendering limit Maximum depth of nested groups can be pre-determined in the host device 101.

Finally, part or all of the print job may be too large to fit in the available storage memory of the device 102. If this occurs, then the job cannot be processed by the device 102.

The process of ensuring that the fillmap can be rendered is performed on the printer host 101, as this system does not have the restrictions that are imposed on the device 102. This means that the host 101 needs to know some information about the device 102 that the fillmap is being sent to, in particular:

(i) the version of the rendering software on the device 102, (ii) the capabilities of the rendering software in the device 102, i.e. the specific functionality that is not available, and (iii) the amount of the physical memory 112 that is available to the rendering process.

Figure 14:
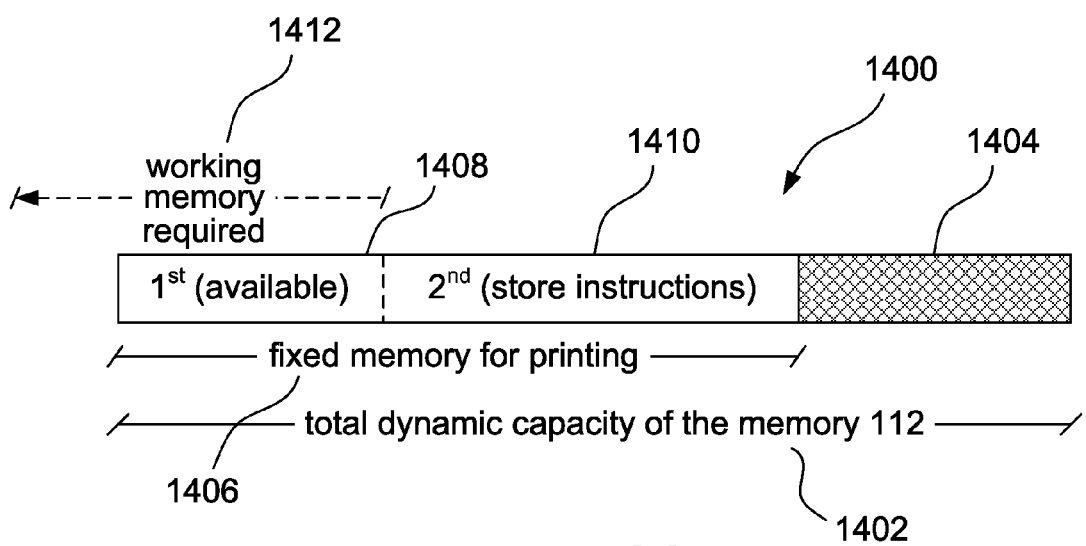
FIG. 14 schematically illustrates a divisional structure of the printer memory.

The first step the host 101 must do is to partition the available fixed memory of the device 102 into working memory (used for the rendering process) and storage memory (used to store the fillmap data). Typically the amount of working memory is pre-determined and the remainder is used as storage memory. It is an advantage of the fillmap format that the required working memory for rendering can be determined An example of this is seen in FIG. 14 which schematically illustrates a divisional structure 1400 of dynamic components of the memory 112 of the print device 102, for example excluding any ROM that may store the device software 110. As seen, the dynamic memory 112 has a total fixed limited capacity 1402, of which a portion 1404 is typically pre-assigned as a dynamic working memory for general operations of the processor 110. Such operations may include, for example, management of user interfaces, communications, variable storage and the like. The balance represents a fixed amount 1406 of the memory 112 that is available for rendering and print operations. The fixed amount 1406 includes a first portion 1408 that is available for actual rendering operations, often described as "working" memory, and a second portion 1410 that is used to store the drawing instructions that described the page to be printed by the rendering operations that use the first portion 1408. Sometimes the sum of the portions 1408 and 1410 are called "working memory". Also illustrated is an amount 1412 of working memory that is actually required to render the specific drawing instructions retained in the storage second portion 1408. As seen, the required working memory 1412 can, for some drawing instructions, exceed the available capacity of the fixed memory 1406 and the total amount 1402.

If the total of the required working memory and the storage memory is less than the available fixed memory, then the unused memory can be used as additional working memory in order to improve rendering performance. One example of this would be to allocate extra decompression buffers, thereby reducing the number of required decompression operations that are performed. In a system with limited amounts of memory, there may not be enough memory available to decompress all required data prior to rendering. In this case, objects may need to be repeatedly decompressed and then thrown away in order to process all the decompressed data. By allocating extra memory for decompressed data, it may be possible to reduce or eliminate the repeated decompression operations. This can result in increased performance.

One method for ensuring that a fillmap can be successfully rendered on a printer device 102 is full-page flattening. This entails rendering the entire page to a bitmap, which is then sent to the device 102 in compressed form. While this will work, subject to the extent of compression, it is inefficient and can introduce compression artefacts in the page output. A better alternative is to perform partial flattening, where only the unrenderable compositing stacks are rendered on the host 101. As a result, there is little increase in data size and therefore compression artefacts can be reduced or eliminated.

Now described is the process of flattening a fillmap that cannot be rendered on the printer device 102, into a form that is able to be rendered on the device 102.

Figure 9:
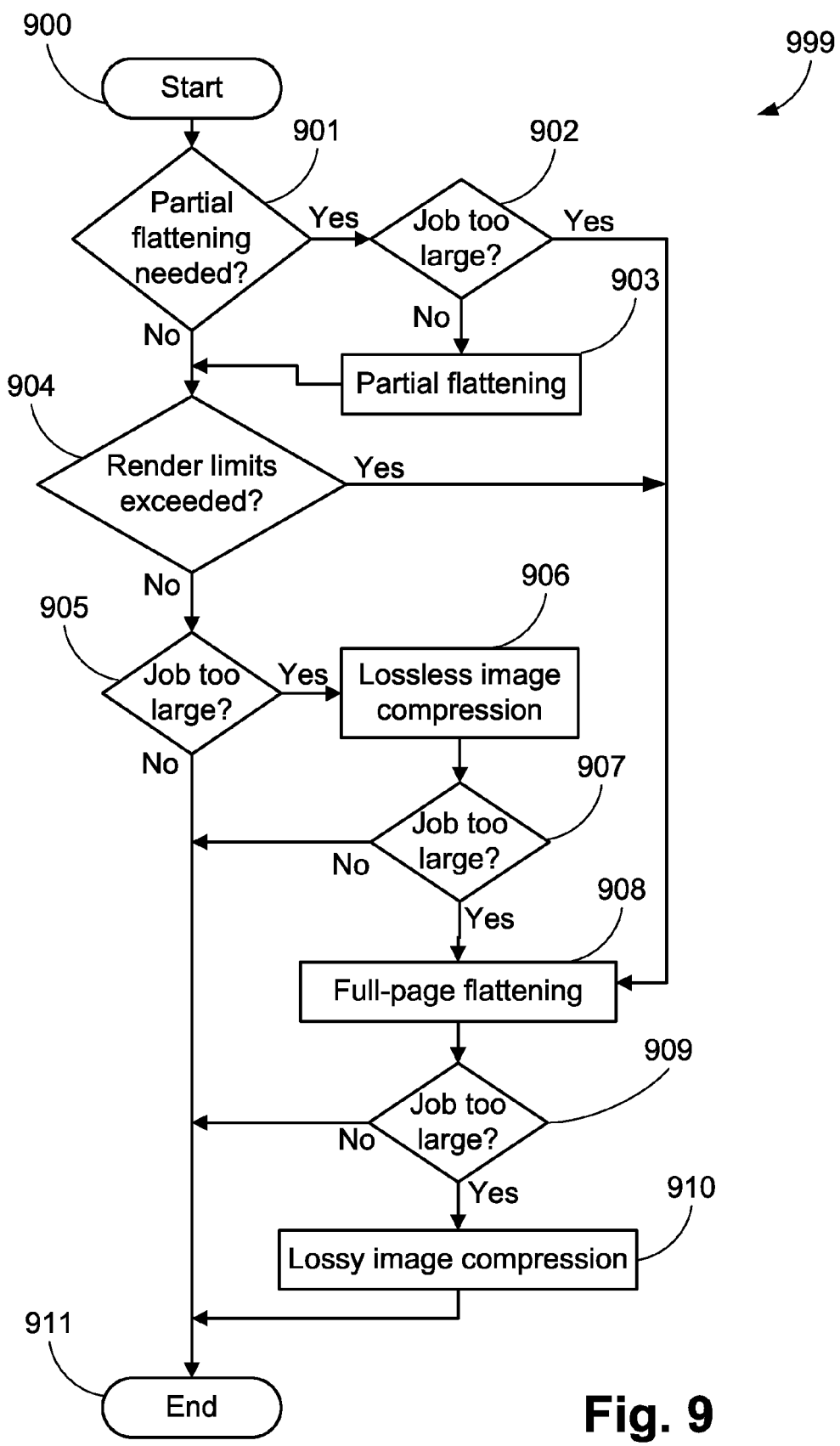
FIG. 9 is a flowchart of a method of fillmap flattening.

FIG. 9 is a flow diagram illustrating one example of a fillmap flattening process 999. This process 999 starts at step 900 after fillmap print data has been created by the host 101, and before the fillmap print data is transferred to the rendering device 102 via the network 103. The process 999 is typically implemented in software as part of the host software 105, and is executed by the host processor 106.

Firstly, in step 901, the process 999 performs a check to see if there are any compositing stacks that are incompatible with the rendering device or process within the printer device 102, indicative of the complexity of the print job. A compositing stack could be incompatible for a variety of reasons, as described above. If there is at least one incompatible compositing stack, then a second test 902 is performed to determine if the job data exceeds the available storage memory of the printer device 102. If this is the case, the print job is deemed to be (too) complex, then processing proceeds to a full-page flattening step 908 (full-page flattening is described in detail in a following section). Step 908 renders the entire page into a new image, which then replaces the original page content. Otherwise, the host 101 performs partial flattening 903 (partial flattening is described in detail in a following section). This involves rendering the incompatible compositing stacks to a new background image, and replacing the references to the compositing stacks with a reference to the compositing stack for the new image. The job is now compatible with the printer device 102.

If it was determined at step 901 that all compositing stacks are compatible with the rendering device or process within the printer device 102, or if partial flattening was performed at step 903 to convert incompatible stacks to compatible ones, the process 999 continues to step 904 where there is a check to see if the job exceeds any rendering limits of the device 102. Examples of such limits could include a maximum number of compositing stacks or fills. If the job exceeds any device limits, then processing proceeds to full-page flattening 908.

Otherwise, a test 905 is made to determine if the job data now exceeds the available storage memory of the device 102. If the device memory is exceeded, the host 101 performs lossless image compression of the source images within the job 906. This can reduce the job size without affecting visual quality. Another test 907 is then made to compare the new job size with the available storage memory of the device 102, again assessing job complexity. If the job is within the device limits, then it is ready for communication to the device 102 and the process 999 of ensuring that the fillmap can be processed by the device ends at step 911. Otherwise, the job is deemed sufficiently complex that processing proceeds to full-page flattening 908.

In the cases where partial flattening and lossless image compression fail to make the fillmap able to be processed by the rendering device or process of the print device 102, the method 999 proceeds to full-page flattening at step 908. Full-page flattening involves rendering the entire job to a new image and replacing the job with the image. All the rendering instructions are replaced with a single instruction to render the image.

Once a job has been flattened to a new image, another test 909 is made to determine if the job data now fits within the available storage memory of the device 102. If this is the case, then the job is ready for shipping to the device 102 and the process 999 concludes at step 911. Otherwise, the host 101 must perform lossy image compression 910 until the job does fit on the device 102. This can involve multiple stages of compression with increasing levels of degradation. Once the compression process is complete, it is guaranteed that the job will fit on the device 102, and it is ready for communication, via step 911, to the device 102.

Partial Flattening

Partial flattening is used when there are some parts of the page which cannot be rendered on the device 102. Partial flattening converts just the unrenderable rendering instructions to an image so that the whole job becomes renderable.

Figure 10A:
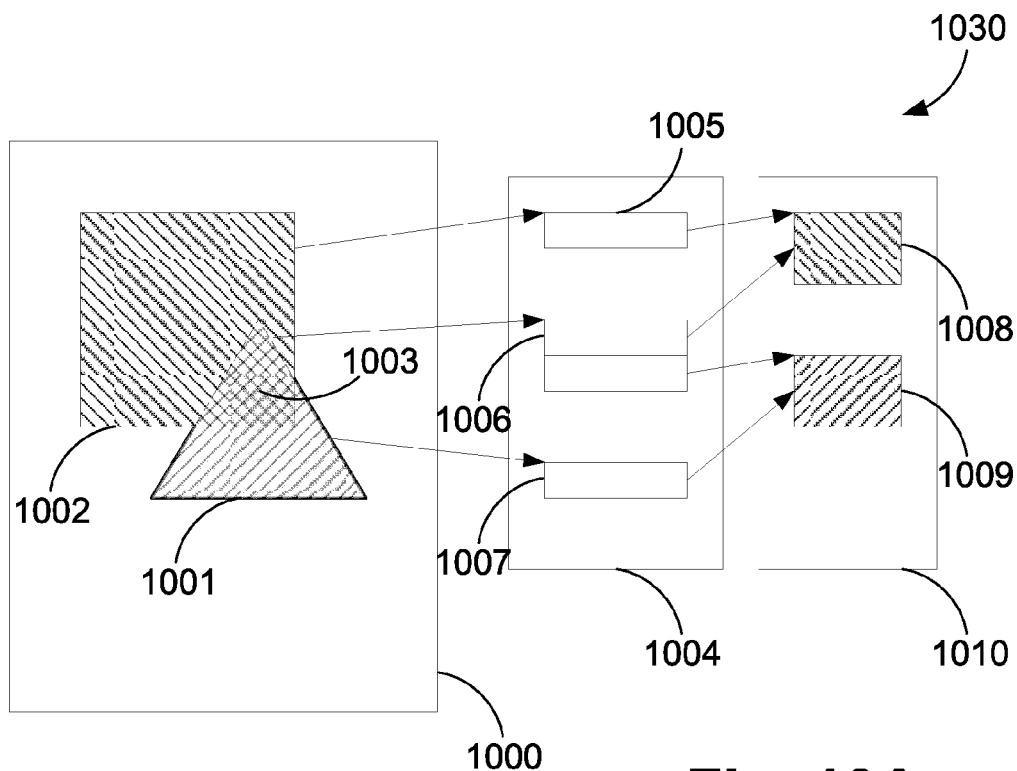
FIGS. 10A and 10B show an example of a fillmap before and after the fillmap has undergone partial flattening.
Figure 10B:
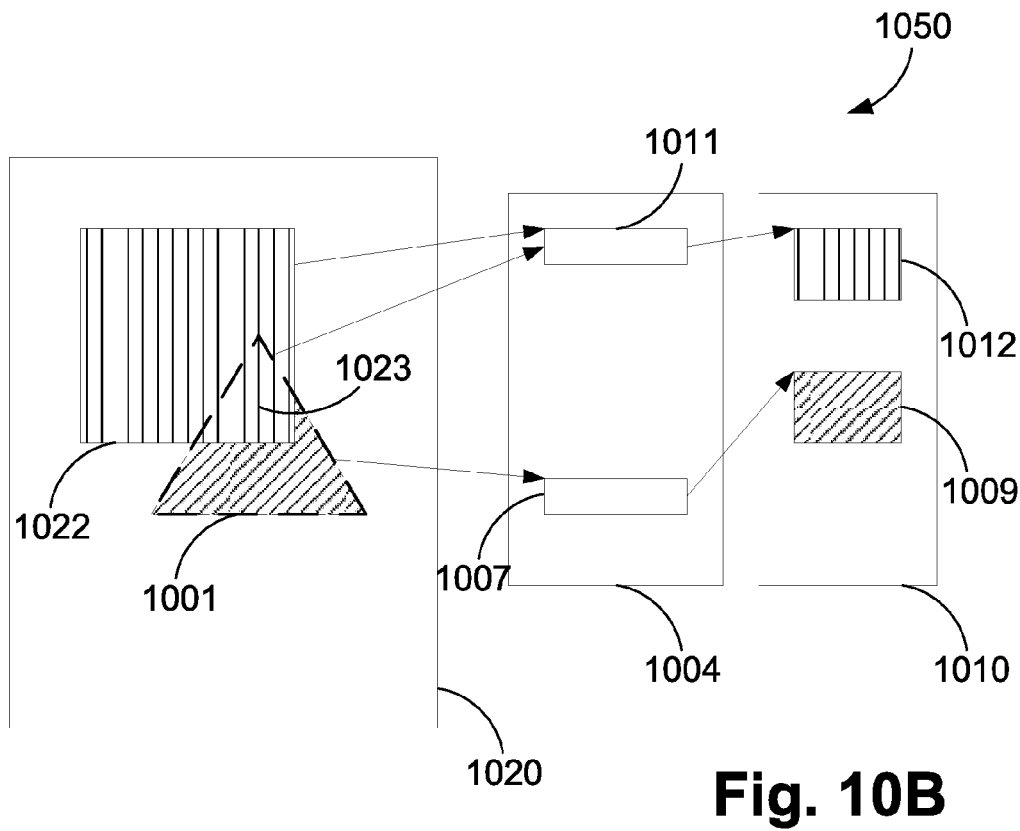

One example of the process of partial flattening is shown in FIGS. 10A and 10B. FIG. 10A shows a fillmap 1030 having a graphical representation of PDL document 1000 that contains a square 1002 composited on top of a triangle 1001. There is a region of overlap 1003 where both objects contribute to the page appearance. The page has been divided into regions, each of which references an entry in a list of compositing stacks 1004. A compositing stack entry 1005 describes the non-overlapping region of the square object 1002. The compositing stack entry 1005 contains a single level that references a fill 1008 in a set of fills 1010, which describes the appearance of the square. Another compositing stack entry 1007 describes the non-overlapping region of the triangle object 1001. It contains a single level that references a fill 1009, which describes the appearance of the triangle. A third compositing stack entry 1006 describes the overlapping region 1003 between the square and the triangle. The region 1003 and thus the stack entry 1006 contains two levels that reference the fill 1008 that describe the square and the fill 1009 that describes the triangle.

In this example, the fill 1008 describing the square object is assumed to be incompatible with the rendering device or process of the print device 102. An example of a reason why it is incompatible could be that rendering the object requires colour space conversion, with this operation not being supported in the device 102. As a result, this fillmap 1030 cannot be sent to the device 102. The fillmap 1030 must undergo partial flattening so that it can be rendered. This process is now described.

The first action is to determine the regions that must be flattened. In this case, there are two compositing stacks 1005 and 1006 that reference the incompatible fill 1008. There are two regions 1002 and 1003 that reference these compositing stacks. Therefore it is necessary to flatten the two regions 1002 and 1003. A new image fill is created that is used as a backdrop for revised fillmap 1050. The regions that were identified previously are rendered to pixels in this new image fill. A new compositing stack is created for this image and the rendered regions are updated to reference this compositing stack. Once the image has been created, any compositing stacks or fills that are no longer required are deleted from the fillmap.

The resultant fillmap 1050 is shown in FIG. 10B. In this fillmap 1050, both the flattened regions 1022 and 1023 have been updated to reference a new compositing stack 1011. This new compositing stack 1011 references the new background image fill 1012. Compositing stacks 1005 and 1006 and fill 1008 are no longer required and have been deleted from the fillmap 1050. The resultant fillmap 1050 is now compatible for rendering by the device 102.

Full-Page Flattening

Full-page flattening is used when a fillmap is too large to fit in the storage memory of the device 102. Full-page flattening involves rendering the entire page to an image on the host 101 and replacing the original fillmap data with the image. If necessary, the image is compressed until the fillmap will fit in the available memory of the device 102.

Figure 11A:
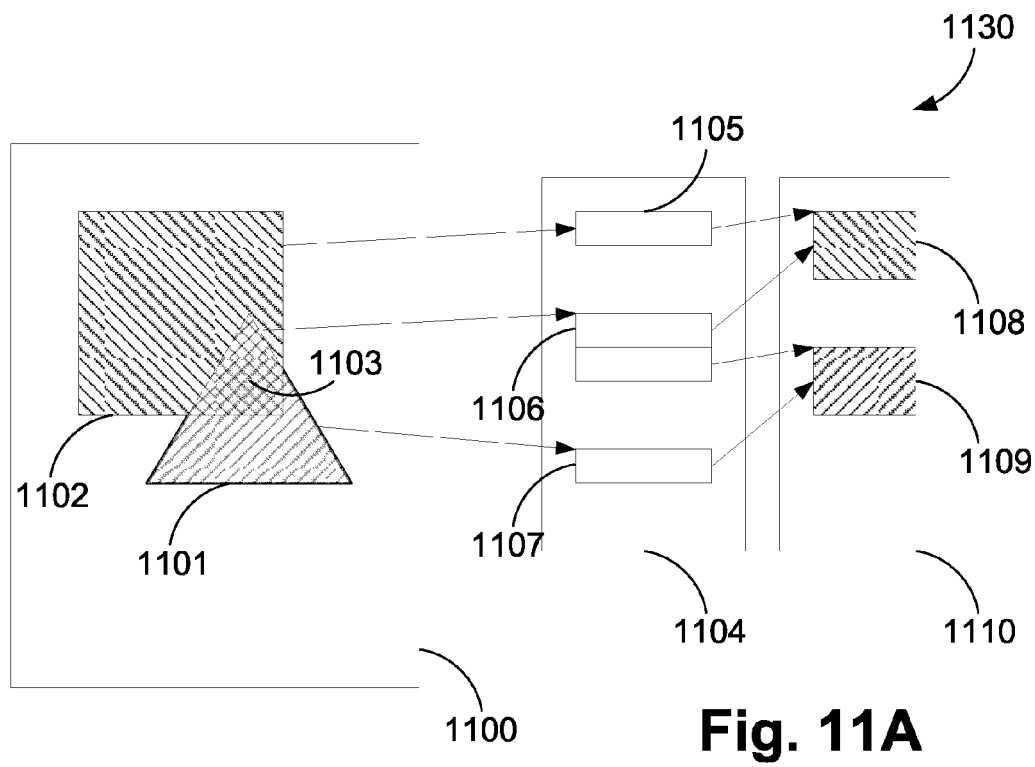
FIGS. 11A and 11B show an example of a fillmap before and after the fillmap has undergone full-page flattening.
Figure 11B:
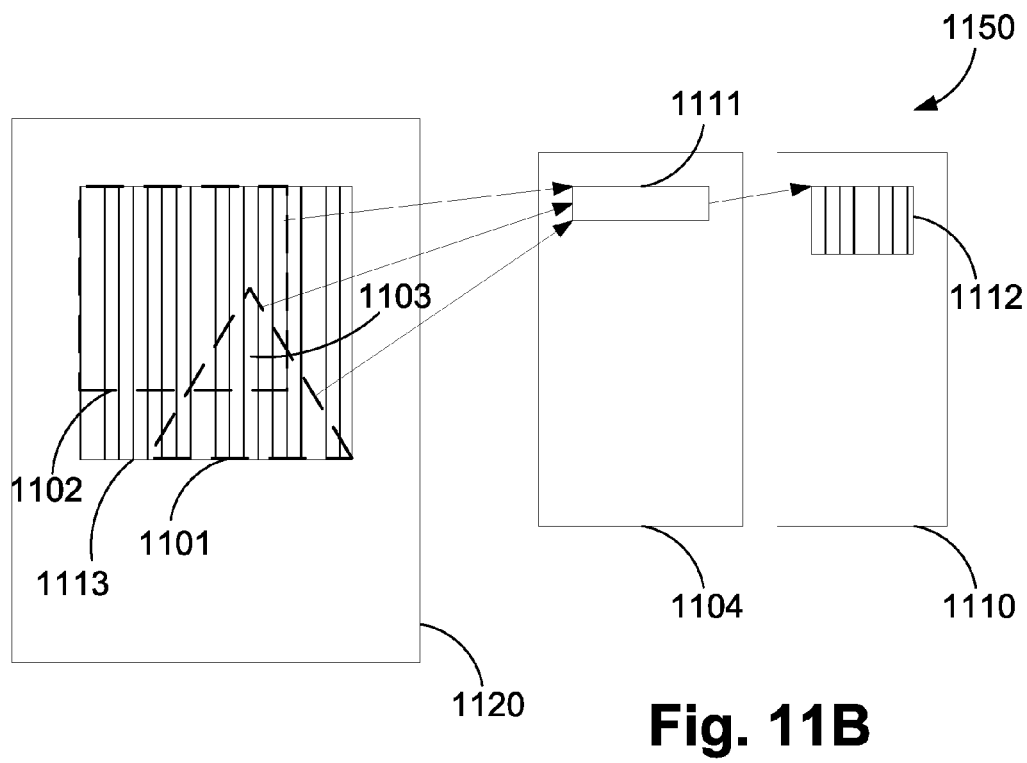

One example of the process of full-page flattening is shown in FIGS. 11A and 11B. FIG. 11A shows a PDL document 1100 that contains a square 1102 composited on top of a triangle 1101. There is a region of overlap 1103 where both objects contribute to the page appearance (e.g. the square at least has an alpha value less than 1.0). It is to be noted that the illustration of FIG. 11A and the above description is just one way the that the objects could combine. If the compositing operation was "Multiply" for instance, both objects would contribute to the appearance of the overlapping region even if the square is fully opaque. In the illustrated example, the page has been divided into regions, each of which references an entry in a list of compositing stacks 1104. A compositing stack entry 1105 describes the non-overlapping region of the square object 1102. The entry 1105 contains a single level that references a fill 1108 in a set of fills 1110, which describes the appearance of the square. Another compositing stack 1107 describes the non-overlapping region of the triangle object 1101. The stack 1107 contains a single level that references a fill 1109, which describes the appearance of the triangle. A third compositing stack 1106 describes the overlapping region 1103. The stack 1106 contains two levels that reference the fill 1108 that describes the square and the fill 1109 that describes the triangle.

In this example, the entire fillmap is assumed to be too large for the rendering device or process of the printer device 102. As a result, this fillmap cannot be sent to the device 102. The fillmap must undergo full-page flattening so that it can be rendered. This process is now described.

The first step in modifying the fillmap to make it compatible with capabilities of the rendering device/process within the device 102, is to create a new image fill 1112 that is used as a backdrop for the page. This fill will contain an image representing the content of the page. A new region 1113 is created that contains all the objects on the page. All the other regions on the page are rendered to pixels in this new image fill 1112. As each region is rendered in this manner, that region is removed from the fillmap. A new compositing stack 1111, seen in FIG. 11B, is created for the new image region 1113. The compositing stack 1111 references the image fill 1112. Any compositing stacks or fills that are not required are deleted from the fillmap.

The resultant fillmap 1150 is shown in FIG. 11B. In this fillmap 1150, all the regions have been updated to reference the new compositing stack 1111. This new compositing stack 1111 references the new background image fill 1112. All the other compositing stacks and fills are no longer required and have been deleted from the fillmap 1150. The fillmap 1150 may still be too large for the device 102, but this can be addressed by compressing the single image using lossless or lossy compression methods until the size now fits in the available device memory. The final fillmap 1150 is now compatible for rendering by the device 102.

INDUSTRIAL APPLICABILITY

The arrangements described are applicable to the computer and data processing industries and particularly to host computing devices configured for sending print jobs to one or more printers having different print job capabilities.

The foregoing describes only some embodiments of the present invention, and modifications and/or changes can be made thereto without departing from the scope and spirit of the invention, the embodiments being illustrative and not restrictive.

The invention claimed is:

1. A method of forming print instructions in a host device for rendering within a fixed amount of memory on an image reproduction device coupled to the host device via a communications network, said method comprising the steps of:
   receiving on the host device intermediate print data comprising regions which are each associated with drawing instructions, said intermediate print data being converted from a page description;
   determining an amount of drawing instruction working memory required to render each drawing instruction;
   calculating a first amount of the memory available on the image reproduction device, said calculating of said first amount being based on the fixed amount of memory on the image reproduction device less an amount of storage memory needed by the image reproduction device to store the intermediate print data;
   selecting, on the host device, a subset of the drawing instructions associated with the determined amount of the drawing instruction working memory which exceeds the first amount of memory available on the image reproduction device to render the intermediate print data;
   rendering on the host device the selected subset of drawing instructions to rendered drawing instructions;
   for the one or more regions associated with the selected subset of drawing instructions, reassociating the one or more regions with the corresponding rendered drawing instructions to form altered intermediate print data which can be rendered on the image reproduction device within the calculated first amount of memory; and
   transmitting print instructions, including the altered intermediate print data, from the host device to the image reproduction device for rendering to pixel data within the fixed amount of memory on the image reproduction device.

2. The method of claim 1, further comprising determining unused memory of the image reproduction device based on the determined amount of the drawing instruction working memory and the amount of the storage memory, and utilizing the unused memory to increase performance of the rendering of the drawing instructions on the image reproduction device.

3. The method of claim 1, further comprising reducing the size and quality of image data until the altered intermediate print data is small enough to fit in the memory of the image reproduction device.

4. The method according to claim 3, wherein the reduction of the image data comprises compressing the image data.

5. The method of claim 3, further comprising rendering, where the altered intermediate data is too large to fit in the memory of the image reproduction device, the intermediate data to a single image such that the drawing instructions comprise the rendered single image.

6. The method according to claim 5, wherein the rendering of the intermediate data comprises rendering the altered intermediate data.

7. The method according to claim 1, wherein intermediate format comprises a fillmap data structure.

8. The method according to claim 1, wherein the image reproduction device comprises a printer device.

9. A non-transitory computer readable storage medium having a program recorded thereon, the program being executable by a processor of a host device to form print instructions for rendering within a fixed amount of memory on a printer device coupled to the host device via a communications network, said program comprising:
   code for receiving on the host device intermediate print data comprising regions which are each associated with drawing instructions, said intermediate print data being converted from a page description;
   code for determining an amount of drawing instruction working memory required to render each drawing instruction;
   code for calculating a first amount of the memory available on the printer device, said calculating of said first amount being based on the fixed amount of memory on the printer device less an amount of storage memory needed by the printer device to store the intermediate print data;
   code for selecting, on the host device, a subset of the drawing instructions associated with the determined amount of the drawing instruction working memory which exceeds the first amount of memory available on the printer device to render the intermediate print data;
   code for rendering on the host device the selected subset of drawing instructions to rendered drawing instructions;
   code for reassociating, for the one or more regions associated with the selected subset of drawing instructions, the one or more regions with the corresponding rendered drawing instructions to form altered intermediate print data which can be rendered on the printer device within the calculated first amount of memory; and
   code for transmitting print instructions, including the altered intermediate print data, from the host device to the printer device for rendering to pixel data within the fixed amount of memory on the printer device.

10. The non-transitory computer readable storage medium of claim 9, further comprising determining unused memory of the printer device based on the determined amount of the drawing instruction working memory and the amount of the storage memory, and utilizing the unused memory to increase performance of the rendering of the drawing instructions on the printer device.

11. The non-transitory computer readable storage medium of claim 9, wherein the program further comprises code for reducing the size and quality of image data until the altered intermediate print data is small enough to fit in the memory of the printer device and the reduction of the image data comprises compressing the image data.

12. The non-transitory computer readable storage medium of claim 11, further comprising code for rendering, where the altered intermediate data is too large to fit in the memory of the printer device, the altered intermediate data to a single image such that the drawing instructions comprise the rendered single image.

13. The non-transitory computer readable storage medium according to claim 9, wherein intermediate format comprises a fillmap data structure.

14. An image reproduction system comprising a host computer apparatus coupled to an image reproduction apparatus via a network, the image reproduction apparatus comprising: a printer engine, a memory having a fixed amount, and a processor for rendering print instructions to pixel values for reproduction by the printer engine;

the host computer apparatus comprising a non-transitory computer readable storage medium having a program recorded thereon, the program being executable by a processor of the host computer apparatus to form print instructions for rendering within the fixed amount of memory on the image reproduction apparatus, said program comprising:

code for receiving on the host computer apparatus intermediate print data comprising regions which are each associated with drawing instructions, said intermediate print data being converted from a page description;

code for determining an amount of drawing instruction working memory required to render each drawing instruction;

code for calculating a first amount of memory available on the image reproduction apparatus, said calculating of said first amount being based on the fixed amount of memory on the image reproduction apparatus less an amount of storage memory needed by the image reproduction apparatus to store the intermediate print data;

code for selecting, on the host computer apparatus, a subset of the drawing instructions associated with the determined amount of the drawing instruction working memory which exceeds the first amount of memory available on the image reproduction apparatus to render the intermediate print data;

code for rendering on the host computer apparatus the selected subset of drawing instructions to rendered drawing instructions;

code for reassociating, for the one or more regions associated with the selected subset of drawing instructions, the one or more regions with the corresponding rendered drawing instructions to form altered intermediate print data which can be rendered on the image reproduction apparatus within the calculated first amount of memory; and code for transmitting print instructions, including the altered intermediate print data, from the host computer apparatus to the image reproduction apparatus for rendering to pixel data within the fixed amount of memory on the image reproduction apparatus.

15. The image reproduction system of claim 14, further comprising determining unused memory of the image reproduction apparatus based on the determined amount of the drawing instruction working memory and the amount of the storage memory, and utilizing the unused memory to increase performance of the rendering of the drawing instructions on the image reproduction apparatus.

16. The image reproduction system of claim 15, wherein the program further comprises code for reducing the size and quality of image data until the altered intermediate print data is small enough to fit in the memory of the image reproduction apparatus and the reduction of the image data comprises compressing the image data.

17. The image reproduction system of claim 16, wherein the program further comprises code for rendering, where the altered intermediate data is too large to fit in the memory of the image reproduction apparatus, the altered intermediate data to a single image such that the drawing instructions comprise the rendered single image.

* * * * *